US012812651B2

(12) United States Patent
Jung et al.

(10) Patent No.: US 12,812,651 B2
(45) Date of Patent: Nov. 24, 2026

(54) METHOD AND APPARATUS FOR TRANSMITTING OR RECEIVING DATA USING COOPERATIVE COMMUNICATION IN WIRELESS COMMUNICATION SYSTEM

(71) Applicant: SAMSUNG ELECTRONICS CO., LTD., Suwon-si (KR)

(72) Inventors: Euichang Jung, Suwon-si (KR); Suha Yoon, Suwon-si (KR); Hoondong Noh, Suwon-si (KR); Jinhyun Park, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 345 days.

(21) Appl. No.: 18/110,580

(22) Filed: Feb. 16, 2023

(65) Prior Publication Data

US 2023/0199786 A1 Jun. 22, 2023

Related U.S. Application Data

(63) Continuation of application No. PCT/KR2021/011470, filed on Aug. 26, 2021.

(30) Foreign Application Priority Data

Aug. 27, 2020 (KR) ........................ 10-2020-0108783

(51) Int. Cl.
*H04W 4/00* (2018.01)
*H04W 72/0457* (2023.01)
(Continued)

(52) U.S. Cl.
CPC ....... *H04W 72/23* (2023.01); *H04W 72/0457* (2023.01); *H04W 72/51* (2023.01); *H04L 5/003* (2013.01); *H04W 88/10* (2013.01)

(58) Field of Classification Search
None
See application file for complete search history.

(56) References Cited

U.S. PATENT DOCUMENTS 9,923,684 B2 3/2018 Ng et al.
12,316,573 B2 * 5/2025 Manolakos ........... H04L 5/0023
(Continued)

FOREIGN PATENT DOCUMENTS

CN 110535608 12/2019
CN 110536394 12/2019
(Continued)

OTHER PUBLICATIONS

International Search Report mailed Nov. 16, 2021 in PCT application PCT/KR2021/011470, 3 pages.
(Continued)

*Primary Examiner* — Bob A Phunkulh
(74) *Attorney, Agent, or Firm* — NIXON & VANDERHYE P.C.

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). Inter-cell coordinated transmission through a multi-transmission reception point (multi-TRP) in a wireless or communication system is described. A terminal receives configuration information related to a multi-TRP, checks whether inter-cell multi-TRP transmission is configured on the basis of the configuration information, based on the inter-cell multi-TRP transmission being configured, checks a control resource set (CORESET) for the multi-TRP on the basis of the configuration information, receives downlink control information (DCI) for the multi-TRP through the CORESET, and receives data from the multi-TRP on the basis of the DCI.

11 Claims, 19 Drawing Sheets

(51) Int. Cl.

| | |
|---|---|
| ***H04W 72/23*** | (2023.01) |
| ***H04W 72/51*** | (2023.01) |
| *H04L 5/00* | (2006.01) |
| *H04W 88/10* | (2009.01) |

(56) References Cited

U.S. PATENT DOCUMENTS

| | | | | |
|---|---|---|---|---|
| 2014/0370889 | A1 | 12/2014 | Zhu et al. | |
| 2019/0238292 | A1 | 8/2019 | Siomina et al. | |
| 2019/0313429 | A1* | 10/2019 | Cheng | H04W 76/27 |
| 2019/0379506 | A1 | 12/2019 | Cheng | |
| 2020/0007292 | A1 | 1/2020 | Huang et al. | |
| 2020/0100225 | A1* | 3/2020 | Khoshnevisan | H04L 1/1854 |
| 2020/0137762 | A1* | 4/2020 | Khoshnevisan | H04W 72/0446 |
| 2020/0154466 | A1 | 5/2020 | Wilson et al. | |
| 2020/0204312 | A1 | 6/2020 | Xu et al. | |
| 2020/0228263 | A1 | 7/2020 | Khoshnevisan et al. | |
| 2020/0351055 | A1* | 11/2020 | Manolakos | H04B 7/088 |
| 2020/0383091 | A1 | 12/2020 | Park et al. | |
| 2020/0404667 | A1* | 12/2020 | Khoshnevisan | H04L 5/0039 |
| 2021/0014883 | A1* | 1/2021 | Khoshnevisan | H04L 1/1896 |
| 2021/0037551 | A1* | 2/2021 | Khoshnevisan | H04L 5/0044 |
| 2021/0044397 | A1* | 2/2021 | Khoshnevisan | H04W 72/23 |
| 2021/0112529 | A1* | 4/2021 | Jassal | H04W 76/27 |
| 2022/0015078 | A1 | 1/2022 | Song et al. | |
| 2022/0052824 | A1 | 2/2022 | Kim et al. | |
| 2022/0061117 | A1* | 2/2022 | Liou | H04L 5/0053 |
| 2022/0095338 | A1 | 3/2022 | Kim et al. | |
| 2022/0131642 | A1 | 4/2022 | Kim et al. | |
| 2022/0150011 | A1* | 5/2022 | Kim | H04L 1/00 |
| 2022/0201619 | A1 | 6/2022 | Yao et al. | |
| 2022/0295516 | A1* | 9/2022 | Matsumura | H04W 72/1263 |
| 2022/0311577 | A1* | 9/2022 | Matsumura | H04B 7/088 |
| 2022/0312440 | A1* | 9/2022 | Bagheri | H04W 72/044 |
| 2022/0322310 | A1* | 10/2022 | Laddu | H04L 5/00 |
| 2022/0345918 | A1* | 10/2022 | Matsumura | H04W 24/08 |
| 2023/0081293 | A1 | 3/2023 | Li | |
| 2023/0113940 | A1* | 4/2023 | Matsumura | H04W 72/231 |
| 2023/0115642 | A1* | 4/2023 | Matsumura | H04W 72/20<br>370/329 |
| 2023/0119019 | A1* | 4/2023 | Matsumura | H04W 72/1268 |
| 2023/0125906 | A1* | 4/2023 | Matsumura | H04B 7/024<br>455/500 |
| 2023/0130217 | A1* | 4/2023 | Matsumura | H04L 5/0023<br>370/329 |
| 2023/0180141 | A1* | 6/2023 | Zhou | H04L 5/001<br>455/522 |
| 2023/0199517 | A1* | 6/2023 | Laddu | H04B 7/022<br>370/329 |
| 2023/0254741 | A1* | 8/2023 | Laddu | H04W 36/0072<br>370/331 |
| 2023/0276435 | A1* | 8/2023 | Matsumura | H04L 5/0023 |
| 2023/0308249 | A1* | 9/2023 | Matsumura | H04L 5/0053 |
| 2023/0337208 | A1* | 10/2023 | Zhou | H04W 72/231 |
| 2026/0075558 | A1* | 3/2026 | Zhang | H04W 56/0045 |

FOREIGN PATENT DOCUMENTS

| | | |
|---|---|---|
| CN | 110945823 | 3/2020 |
| CN | 111344994 | 6/2020 |
| CN | 111435920 | 7/2020 |
| JP | 2016-506690 | 3/2016 |
| KR | 10-2020-0051726 | 5/2020 |
| RU | 2727176 | 7/2020 |
| WO | 2019/051177 | 3/2019 |
| WO | 2020/037207 | 2/2020 |
| WO | 2020/094344 | 5/2020 |
| WO | 2020/102502 | 5/2020 |
| WO | 2020/122581 | 6/2020 |
| WO | 2020/144626 | 7/2020 |
| WO | 2020/145797 | 7/2020 |
| WO | 2020/162714 | 8/2020 |
| WO | 2020/167018 | 8/2020 |
| WO | 2021/186726 | 9/2021 |

OTHER PUBLICATIONS

Written Opinion of the ISA mailed Nov. 16, 2021 in PCT application PCT/KR2021/011470, 3 pages.

3GPP TSG RAN WG1 #102e, R1-2006845, Nokia, Nokia Shanghai Bell, "Enhancements to enable inter-cell multi-TRP operation", e-Meeting, Aug. 17-28, 2020, 8 pages.

3GPP TSG RAN WG1 #102e, R1-2005562, Sony, "Considerations on inter-cell operation", e-Meeting, Aug. 17-28, 2020, 6 pages.

3GPP TSG RAN WG1 #102e, R1-2006392, Huawei, HiSilicon, "Enhancements on inter-cell Multi-TRP operations in Rel-17", E-meeting, Aug. 17-28, 2020, 5 pages.

3GPP TSG RAN WG1 #102e, R1-2005286, Futurewei, "Inter-cell multi-TRP operation", e-Meeting, Aug. 17-28, 2020, 7 pages.

Extended European Search Report for EP Application No. 21862103.5 dated Dec. 20, 2023, 8 pages.

Office Action for RU Application No. 2023104022 mailed Jun. 28, 2024 and English translation, 18 pages.

Notice of Allowance for JP Application No. 2023-513850 dated Apr. 30, 2025 and English translation, 7 pages.

Samsung, "On Rel. 17 FeMIMO WI" 3GPP TSG RAN WG1 #101, e-Meeting, May 25-Jun. 5, 2020, R1-2003918, 12 pages.

Samsung, "View on Further Enhancements on MIMO for NR" 3GPP TSG-RAN Meeting # 88e, Electronic Meeting, Jun. 29-Jul. 3, 2020, Agenda: 9.10.1, RP-200619, 18 pages.

Office Action for VN Application No. 1-2023-01150 dated Aug. 16, 2025 and English translation, 4 pages.

Office Action for KR Application No. 10-2020-0108783 dated Aug. 26, 2025 and English translation, 10 pages.

Office Action for EP Application No. 21862103.5 dated Nov. 3, 2025, 8 pages.

NTT Docomo, Inc, "Discussion on inter-cell multi-TRP operations", R1-2006720, EGPP TSG RAN WG1 #102-e, e-Meeting, Aug. 17-Aug. 28, 2020, 3 pages.

ZTE, "Maintenance of multi-TRP enhancements", R1-2005451, 3GPP TSG RAN WG1 Meeting #102-e, 3-Meeting, Aug. 17-Aug. 28, 2020, 13 pages.

Spreadtrum Communications, "Discussion on enhancement multi-TRP inter-cell operation", R1-2006259, e-Meeting, Aug. 17-Aug. 28, 2020, 3 pages.

Office Action for CN Application No. 202180052449.0 issued Jan. 22, 2026 and English translation, 17 pages.

Office Action for VN Application No. 1-2023-01150 dated Apr. 28, 2026 and English translation, 4 pages.

Office Action for KR Application No. 10-2020-0108783 issued Jun. 23, 2026 and English translation, 14 pages.

Office Action for CN Application No. 202180052449.0 issued Jul. 2, 2026 and English translation, 20 pages.

Australian Office Action issued Jul. 23, 2026 in corresponding Australian Patent Application No. 2021332979.

* cited by examiner

METHOD AND APPARATUS FOR TRANSMITTING OR RECEIVING DATA USING COOPERATIVE COMMUNICATION IN WIRELESS COMMUNICATION SYSTEM

CROSS-REFERENCE TO RELATED APPLICATIONS

This application is a continuation of International Application No. PCT/KR2021/011470 designating the United States, filed on Aug. 26, 2021, in the Korean Intellectual Property Receiving Office and claiming priority to Korean Patent Application No. 10-2020-0108783, filed on Aug. 27, 2020, in the Korean Intellectual Property Office, the disclosures of which are incorporated by reference herein in their entireties.

BACKGROUND

Field

The disclosure relates to a wireless communication system and, for example, to an inter-cell coordinated communication using multiple cells.

Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access(NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Coordinated multi-point (CoMP), which is a new type of inter-cell coordinated technology, may be used to increase the throughput of a terminal located at a cell edge. CoMP is a technology which enables neighboring cells to cooperate and allow other cells as well as a serving cell to communicate with the same terminal, so as to reduce inter-cell interference and increase the throughput of the terminal at the cell edge.

SUMMARY

Embodiments of the disclosure provide various techniques for multiple transmission reception points (TRPs) (hereinafter, multiple TRPs)-based COMP (e.g., non-coherent joint transmission (NC-JT)) in a frequency band of a wireless communication system (e.g., an LTE frequency band and an NR frequency band may be included). For example, the disclosure provides a method of grouping multiple cells and a method of configuring the structure of a CORESET to be monitored by a terminal within a grouped cell. In addition, the disclosure provides higher layer signaling for a terminal according to a cell grouping method.

A method according to various example embodiments of the disclosure includes: receiving configuration information related to a multi-transmission reception point (multi-TRP); identifying whether inter-cell multi-TRP transmission is configured based on the configuration information; based on inter-cell multi-TRP transmission being configured, identifying a control resource set (CORESET) for multi-TRP based on the configuration information; receiving downlink control information (DCI) for the multi-TRP through the CORESET; and receiving data from the multi-TRP based on the DCI.

In addition, according to various example embodiments of the disclosure, a method by a base station in a wireless communication system includes: transmitting configuration information related to a multi-transmission reception point (multi-TRP); based on inter-cell multi-TRP transmission being configured, transmitting downlink control information (DCI) for the multi-TRP through a control resource set (CORESET) for multi-TRP based on the configuration information; and transmitting data through the multi-TRP based on the DCI.

In addition, according to various example embodiments of the disclosure, a terminal in a wireless communication system includes: a transceiver; and a controller configured to: receive configuration information related to a multi-transmission reception point (multi-TRP) through the transceiver; identify whether inter-cell multi-TRP transmission is configured based on the configuration information; based on inter-cell multi-TRP transmission being configured, identify a control resource set (CORESET) for multi-TRP based on the configuration information; receive downlink control information (DCI) for the multi-TRP through the CORESET through the transceiver; and receive data from the multi-TRP based on the DCI through the transceiver.

In addition, according to various example embodiments of the disclosure, a base station in a wireless communication system includes:

A transceiver; and a controller configured to: transmit configuration information related to a multi-transmission reception point (multi-TRP) through the transceiver; based on inter-cell multi-TRP transmission being configured, transmit downlink control information (DCI) for the multi-TRP through a control resource set (CORESET) for multi-TRP based on the configuration information through the transceiver; and transmit data through the multi-TRP based on the DCI through the transceiver.

In addition, according to various example embodiments of the disclosure, a method by a terminal in a wireless communication system includes: receiving configuration information related to coordinated transmission from a serving cell of a base station; identifying whether coordinated transmission between the serving cell and a non-serving cell is configured based on the configuration information; based on the coordinated transmission being configured, identifying a control resource set (CORESET) for coordinated transmission based on the configuration information; receiving downlink control information (DCI) for the coordinated transmission through the CORESET; and receiving data from the serving cell and the non-serving cell based on the DCI.

According to example embodiments of the disclosure, a method for configuring information including at least one of information on a cell group, BWP, CORESET, and CORESETPool index, which are monitored by a terminal when performing multiple TRP-based NC-JT, are provided so as to enable inter-cell based multi TRP based operation to be performed in the same band, frequency band, and the like.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
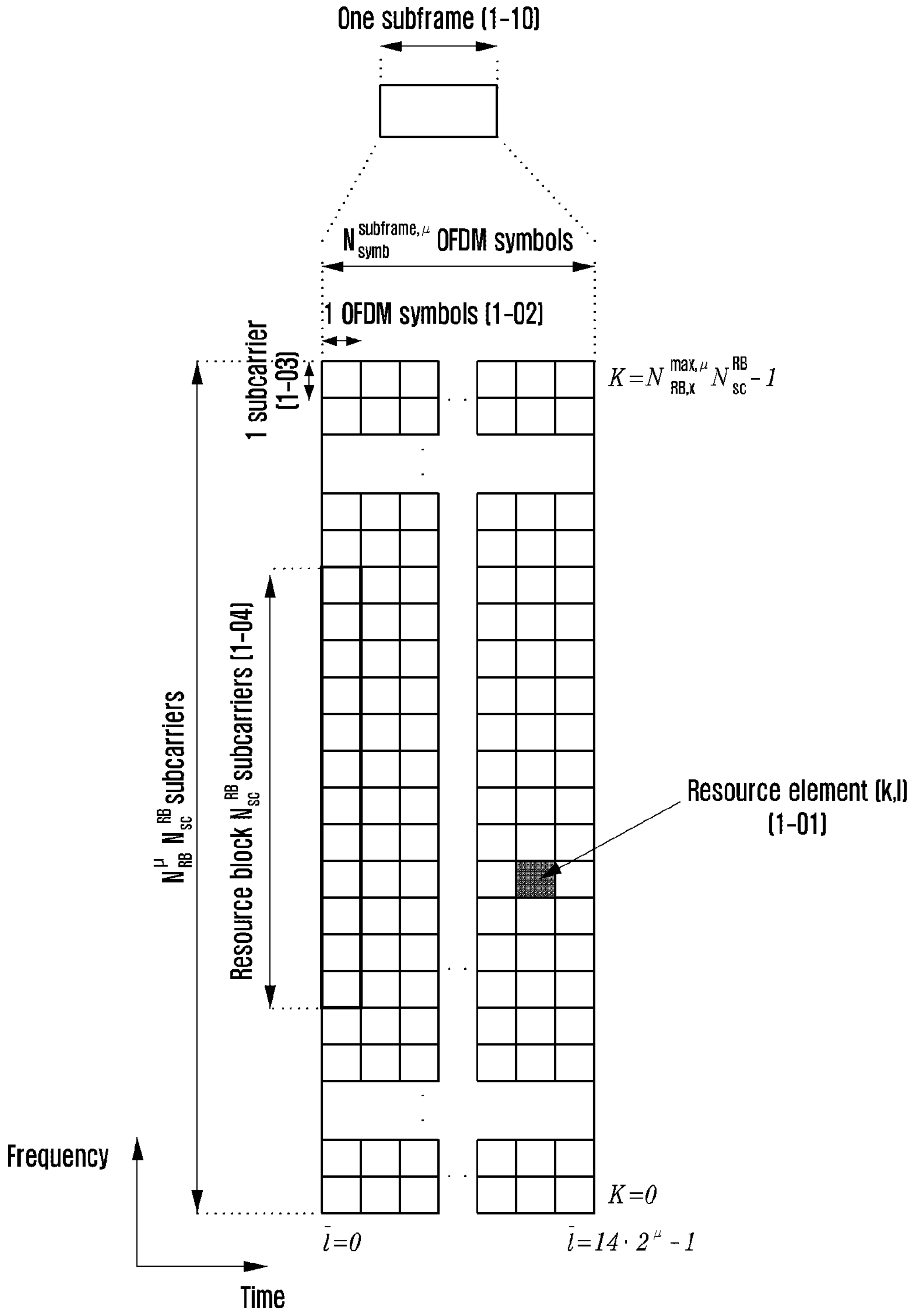
FIG. 1 illustrates an example of a basic structure of a time-frequency domain, which is a radio resource domain in which data or a control channel is transmitted in a wireless communication system according to example embodiments of the disclosure.

Hereinafter, example embodiments of the disclosure will be described in detail with reference to the accompanying drawings.

In describing the example embodiments, descriptions related to technical contents well-known in the art to which the disclosure pertains and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of example embodiments of the disclosure and ways to achieve them will be apparent by making reference to example embodiments as described below in detail in conjunction with the accompanying drawings. However, the disclosure is not limited to the example embodiments set forth below, but may be implemented in various different forms. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Furthermore, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, according to some embodiments, the "unit" may include one or more processors.

Hereinafter, operation principles will be described in detail with reference to the accompanying drawings. In the following description of the technical idea of the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification. In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. Of course, examples of the base station and the terminal are not limited thereto. In the following description, technology for receiving broadcast information from a base station by a terminal in a wireless communication system will be described. The disclosure relates to a communication technique for converging Internet of things (IoT) technology with 5th generation (5G) communication systems designed to support a higher data transfer rate beyond 4th generation (4G) systems, and a system therefor. The disclosure may be applied to intelligent services (e.g., smart homes, smart buildings, smart cities, smart cars or connected cars, healthcare, digital education, retail business, security and safety-related services, etc.) on the basis of 5G communication technology and IoT-related technology.

In the following description, terms referring to broadcast information, terms referring to control information, terms related to communication coverage, terms referring to state changes (e.g., an event), terms referring to network entities, terms referring to messages, terms referring to device elements, and the like are illustratively used for the sake of convenience. Therefore, the disclosure is not limited by the terms as used below, and other terms referring to subjects having equivalent technical meanings may be used.

In the following description, some of terms and names defined in the 3rd generation partnership project (3GPP) LTE or NR standards may be used for the convenience of description. However, the disclosure is not limited by these terms and names, and may be applied in the same way to systems that conform other standards.

A wireless communication system is advancing to a broadband wireless communication system for providing high-speed and high-quality packet data services using communication standards, such as high-speed packet access (HSPA) of 3GPP, LTE {long-term evolution or evolved universal terrestrial radio access (E-UTRA)}, LTE-Advanced (LTE-A), LTE-Pro, high-rate packet data (HRPD) of 3GPP2, ultra-mobile broadband (UMB), IEEE 802.16e, and the like, as well as typical voice-based services.

As an example of a broadband wireless communication system, an LTE system employs an orthogonal frequency division multiplexing (OFDM) scheme in a downlink (DL) and employs a single carrier frequency division multiple access (SC-FDMA) scheme in an uplink (UL). The uplink indicates a radio link through which a user equipment (UE) {or a mobile station (MS)} transmits data or control signals to a base station (BS) (eNode B), and the downlink indicates a radio link through which the base station transmits data or control signals to the UE. The above multiple access scheme separates data or control information of respective users by allocating and operating time-frequency resources for transmitting the data or control information for each user so as to avoid overlapping each other, that is, so as to establish orthogonality.

A 5G communication system, which is a post-LTE communication system, must reflect and support various requirements of users, service providers, and the like. The services considered in the 5G communication system include enhanced mobile broadband (eMBB) communication, massive machine-type communication (mMTC), ultra-reliability low-latency communication (URLLC), and the like.

According to some example embodiments, eMBB aims at providing a data rate higher than that supported by existing LTE, LTE-A, or LTE-Pro. For example, in an example 5G communication system, eMBB must provide a peak data rate of 20 Gbps in the downlink and a peak data rate of 10 Gbps in the uplink for a single base station. Furthermore, an example 5G communication system must provide an increased user-perceived data rate to the UE, as well as the maximum data rate. In order to satisfy such requirements, transmission/reception technologies including a further enhanced multi-input multi-output (MINMO) transmission technique are required to be improved. In addition, the data rate required for the 5G communication system may be obtained using a frequency bandwidth more than 20 MHz in a frequency band of 3 to 6 GHz or 6 GHz or more, instead of transmitting signals using a transmission bandwidth up to 20 MHz in a band of 2 GHz used in LTE.

In addition, mMTC is being considered to support application services such as the Internet of Things (IoT) in the 5G communication system. mMTC has requirements, such as support of connection of a large number of UEs in a cell, enhancement coverage of UEs, improved battery time, a reduction in the cost of a UE, and the like, in order to effectively provide the Internet of Things. Since the Internet of Things provides communication functions while being provided to various sensors and various devices, it must support a large number of UEs (e.g., 1,000,000 UEs/km2) in a cell. In addition, the UEs supporting mMTC may require wider coverage than those of other services provided by the 5G communication system because the UEs are likely to be located in a shadow area, such as a basement of a building, which is not covered by the cell due to the nature of the service. The UE supporting mMTC must be configured to be inexpensive, and may require a very long battery life-time because it is difficult to frequently replace the battery of the UE.

Lastly, URLLC, which is a cellular-based mission-critical wireless communication service, may be used for remote control for robots or machines, industrial automation, unmanned aerial vehicles, remote health care, emergency alert, and the like. Thus, URLLC must provide communication with ultra-low latency and ultra-high reliability. For example, a service supporting URLLC must satisfy an air interface latency of less than 0.5 ms, and also requires a packet error rate of 10-5 or less. Therefore, for the services supporting URLLC, a 5G system must provide a transmit time interval (TTI) shorter than those of other services, and also requires a design for assigning a large number of resources in a frequency band in order to secure reliability of a communication link. However, the above-described mMTC, URLLC, and eMBB are only examples of different types of services, and service types to which the disclosure is applicable are not limited to the above-described examples.

The above-described services considered in an example 5G communication system must be converged with each other so as to be provided based on one framework. That is, the respective services are preferably integrated into a single system and controlled and transmitted in the integrated single system, instead of being operated independently, for efficient resource management and control.

Furthermore, in the following example description of embodiments of the disclosure, LTE, LTE-A, LTE Pro, or NR systems will be described by way of example, but the example embodiments of the disclosure may be applied to other communication systems having similar technical backgrounds or channel types. In addition, based on determinations by those skilled in the art, the example embodiments of the disclosure may also be applied to other communication systems through some modifications without significantly departing from the scope of the disclosure.

As used in the following description, terms referring to broadcast information, terms referring to control information, terms related to communication coverage, terms referring to state changes (e.g., an event), terms referring to network entities, terms referring to messages, terms referring to device elements, and the like are illustratively used for the sake of convenience. Therefore, the disclosure is not limited by the terms as used below, and other terms referring to subjects having equivalent technical meanings may be used.

In the following description, some of terms and names defined in the 3$^{rd}$ generation partnership project long term evolution (3GPP LTE) standards may be used for the convenience of description. However, the disclosure is not limited by these terms and names, and may be applied in the same way to systems that conform other standards.

FIG. 1 illustrates an example basic structure of a time-frequency domain, which is a radio resource domain to which data or a control channel is transmitted in an example wireless communication system.

Referring to FIG. 1, a horizontal axis represents a time domain, and a vertical axis represents a frequency domain. A basic unit of a resource in the time and frequency domain is a resource element (RE) 1-01 and may be defined as one orthogonal frequency division multiplexing (OFDM) symbol 1-02 on the time domain and one subcarrier 1-03 on the frequency domain. In the frequency domain, $$N_{sc}^{RB} \text{ (e.g., 12)}$$

(e.g., 12) consecutive REs may configure one resource block (RB) 1-04.

Figure 2:
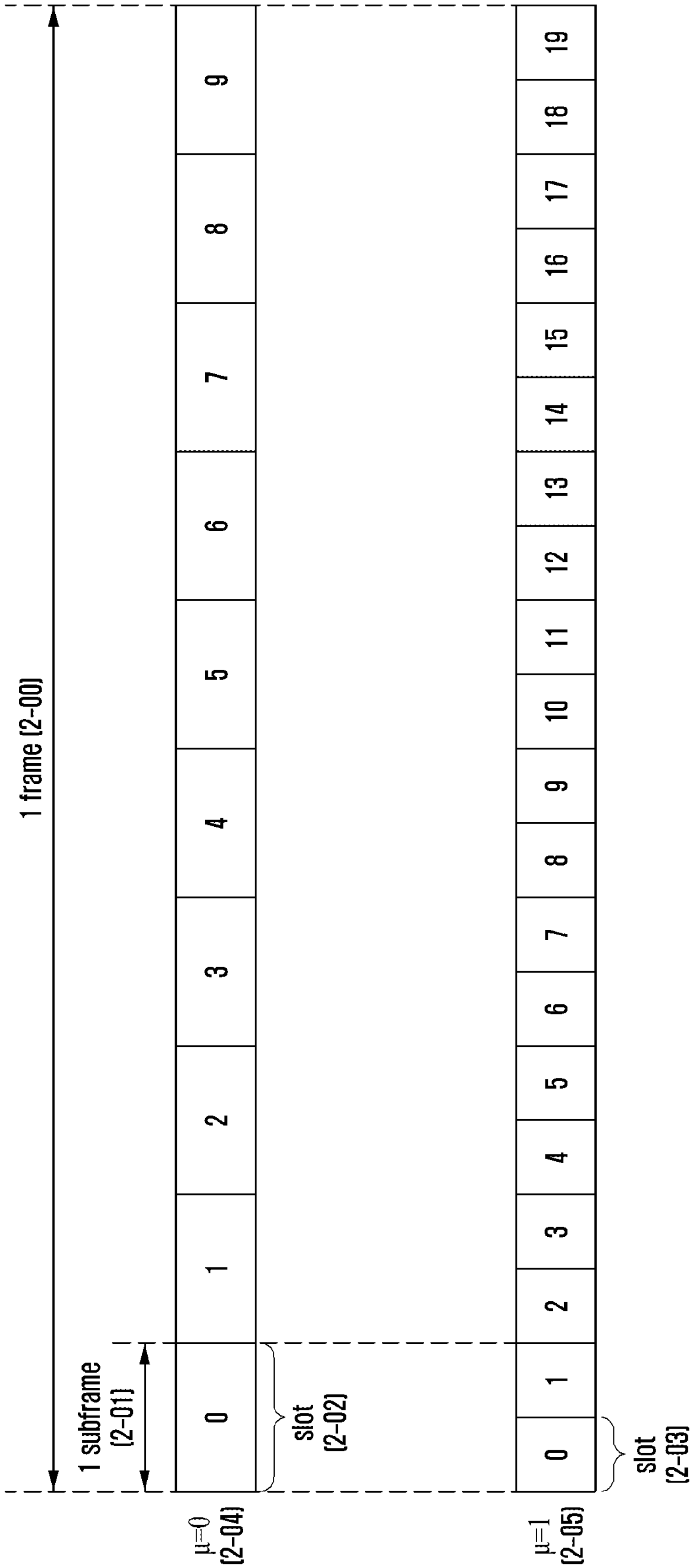
FIG. 2 illustrates a frame, a subframe, and a slot structure in an example 5G system.

FIG. 2 illustrates a frame, a subframe, and a slot structure in an example 5G system.

FIG. 2 illustrates an example of the structure of a frame 2-00, a subframe 2-01, and a slot 2-02. 1 frame 2-00 may be defined as 10 ms. 1 subframe 2-01 may be defined as 1 ms, and 1 frame 2-00 may be configured by a total of 10 subframes 2-01. 1 slot 2-02 or 2-03 may slot be defined as 14 OFDM symbols (that is, the number of symbols per slot $$(N_{symb}^{slot})$$

may has a value of 14). 1 subframe 2-01 may be configured by one or multiple slots 2-02 and 2-03, and the number of slots 2-02 and 2-03 per 1 subframe 2-01 may differ according to configuration value (μ) 2-04 or 2-05 for a subcarrier spacing.

In an example of FIG. 2, a case in which the subcarrier spacing configuration value (μ) has a value of '0' (indicated by reference numeral 2-04) and a case in which the subcarrier spacing configuration value (g) has a value of '1' (indicated by reference numeral 2-05) are illustrated. In a case of μ=0 (indicated by reference numeral 2-04), 1 subframe 2-01 may include 1 slot 2-02, and in a case of μ=1 (indicated by reference numeral 2-05), 1 subframe 2-01 may include two slots 2-03. That is, the number of slots per 1 subframe $$(N_{slot}^{subframe,\mu})$$

may differ according to a subcarrier spacing configuration value (μ), and accordingly, the number of slots per 1 frame $$(N_{slot}^{frame,\mu})$$

may differ. The number of slots per subframe $$(N_{slot}^{subframe,\mu})$$

and the number of slots per frame $$(N_{slot}^{frame,\mu})$$

according to each subcarrier spacing configuration (μ) may be defined as Table 1 below.

TABLE 1

| μ | $N_{symb}^{slot}$ | $N_{slot}^{frame,\mu}$ | $N_{slot}^{subframe,\mu}$ |
|---|---|---|---|
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In NR, one component carrier (CC) or serving cell may include up to 250 RBs or more. Therefore, when a UE always receives the entire serving cell bandwidth, such as in LTE, power consumption of the UE may be extreme. In order to solve this problem, a base station may configure one or more bandwidth parts (BWPs) for the UE so as to support the UE to change a reception area within a cell.

In NR, the base station may configure an 'initial BWP', which is a bandwidth of CORESET #0 (or common search space (CSS)), for the UE via an MIB. Thereafter, the base station may configure a first BWP of the UE via RRC signaling, and may notify the UE of one BWP configuration information that can be indicated through downlink control information (DCI) in the future. Thereafter, the base station may notify the UE of a BWP ID via DCI so as to indicate which band the UE is to use. In a situation where the UE fails to receive DCI in a currently allocated BWP for a specific period of time or more, the UE may return to a 'default BWP' and attempt to receive DCI.

Figure 3:
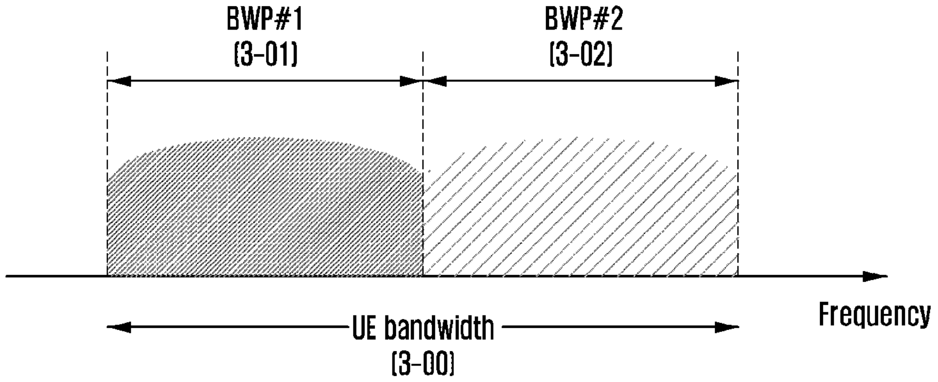
FIG. 3 illustrates a configuration of a bandwidth part in a wireless communication system according to example embodiments of the disclosure.

FIG. 3 illustrates an example configuration for a bandwidth part in a wireless communication system according to an example embodiment of the disclosure.

Referring to FIG. 3, a UE bandwidth 3-00 may include two BWPs, that is, BWP #1 3-01 and BWP #2 3-02. The base station may configure one or multiple BWPs for the UE, and may configure pieces of information as shown in Table 2 below for each bandwidth part.

TABLE 2

| | |
|---|---|
| Configuration information 1 | Bandwidth of a bandwidth part (the number of PRBs constituting the bandwidth part) |
| Configuration information 2 | Frequency position of a bandwidth part (this information may include an offset value compared to a reference point, wherein the reference point may include, for example, a center frequency of a carrier, a synchronization signal, a synchronization signal raster, etc.) |

TABLE 2-continued

| | |
|---|---|
| Configuration information 3 | Numerology of a bandwidth part (e.g., a subcarrier spacing, a cyclic prefix (CP) length, etc.) |
| Others | |

In addition to the configuration information described in Table 2, various parameters related to a BWP may be configured for the UE. The information described above may be transmitted by the base station to the UE via higher layer signaling, for example RRC signaling. At least one BWP among the configured one or more BWPs may be activated. Information indicating whether the configured BWP has been activated may be semi-statically transmitted from the base station to the UE via RRC signaling or may be dynamically transmitted through MAC control element (CE) or DCI.

The configuration of the BWP supported by the above-described example 5G communication system may be used for various purposes.

For example, in situation where a bandwidth supported by the UE is less than a system bandwidth, the bandwidth supported by the UE may be supported through the BWP configuration. For example, a frequency position (configuration information 2) of the BWP in Table 2 is configured for the UE to enable the UE to transmit or receive data at a specific frequency position within the system bandwidth.

As another example, the base station may configure multiple BWPs in the UE for the purpose of supporting different numerologies. For example, in order to support both data transmission/reception to/from a predetermined UE by using a subcarrier spacing of 15 kHz and a subcarrier spacing of 30 kHz, two BWPs may be configured to use a subcarrier spacing of 15 kHz and a subcarrier spacing of 30 kHz, respectively. Different BWPs may be frequency division multiplexed (FDMed), and when attempting to transmit or receive data at a specific subcarrier spacing, the BWP configured with the corresponding subcarrier spacing may be activated.

As still another example, the base station may configure, in the UE, the BWPs having bandwidths of different sizes for the purpose of reducing power consumption of the UE. For example, when the UE supports a very large bandwidth, for example, a bandwidth of 100 MHz, and transmits or receives data through the corresponding bandwidth, the transmission or reception may cause very high power consumption in the UE. In particular, when the UE performs monitoring on an unnecessary downlink control channels of an unnecessarily large bandwidth of 100 MHz even when there is no traffic, the monitoring may be very inefficient in terms of power consumption. Therefore, in order to reduce power consumption of the UE, the base station may configure, for the UE, a BWP of a relatively small bandwidth, for example, a BWP of 20 MHz. In a situation without traffic, the UE may perform a monitoring operation on a BWP of 20 MHz. When data is present in or for the UE, the UE may transmit or receive data in a BWP of 100 MHz according to an indication of the base station.

Figure 4:
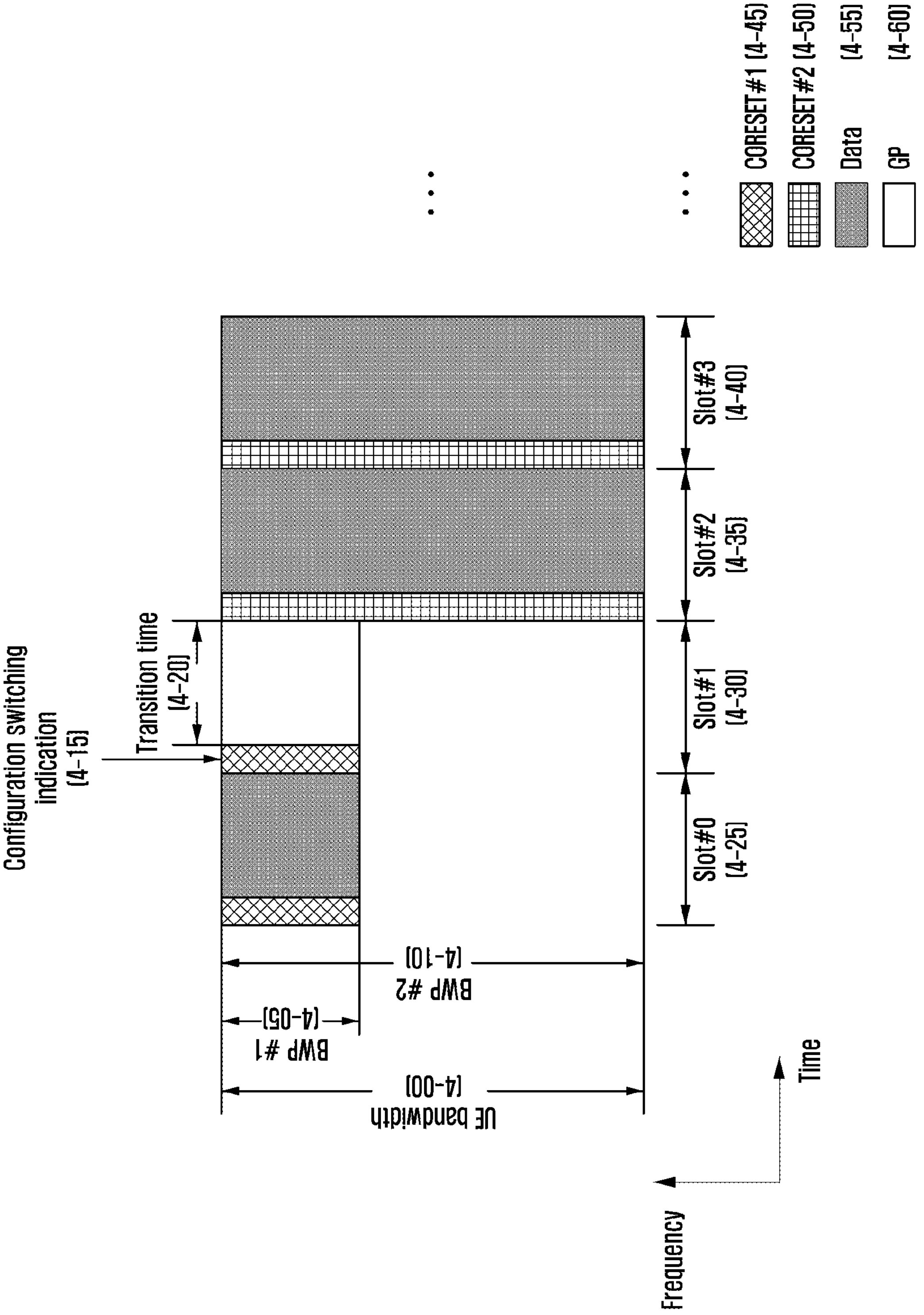
FIG. 4 illustrates a method of changing dynamic configuration for a bandwidth part according to example embodiments of the disclosure.

FIG. 4 illustrates a method of changing a dynamic configuration for a bandwidth part according to an example embodiment of the disclosure.

Referring to FIG. 4, as described in Table 2, a base station may configure one or more bandwidth parts for a UE, and may notify a UE of information on a bandwidth of a bandwidth part, a frequency position of the bandwidth part, and the numerology of the bandwidth part as a configuration for each bandwidth part. A shown in FIG. 4, two bandwidth parts, that is, a first bandwidth part (BWP #1) 4-05 and a second bandwidth part (BWP #2) 4-10, within a UE bandwidth 4-00 may be configured in the UE. One or multiple bandwidth parts in the configured bandwidth may be activated, and an example in which one bandwidth part is activated is considered in FIG. 4. BWP #1 4-05 among bandwidth parts configured in slot #0 4-25 is activated, the UE may monitor a physical downlink control channel (PDCCH) in a first CORESET #1 4-45 configured in BWP #1 4-05, and data 4-55 may be transmitted or received in the BWP #1 4-05. A control area in which the UE receives the PDCCH may be different according to a bandwidth part, which is activated, among the configured bandwidth parts, and a bandwidth in which the UE monitors the PDCCH may vary accordingly.

The base station may additionally transmit, to the UE, an indicator for switching the configuration of the bandwidth part. Here, switching of the configuration of the bandwidth part may be considered to be the same as an operation of activating a specific bandwidth part (for example, changing of activation from bandwidth part A to bandwidth part B). The base station may transmit a configuration switching indicator to the UE in a specific slot. The UE may receive the configuration switching indicator from the base station, and then may determine a bandwidth part to be activated, by applying a switched configuration according to the configuration switching indicator from a specific time point. In addition, the UE may monitor the PDCCH in a control area configured in the activated bandwidth part.

In FIG. 4, the base station may transmit, to the UE, a configuration switching indicator 4-15 that indicates switching of the activated bandwidth part from existing BWP #1 4-05 to BWP #2 4-10, in slot #1 4-30. After receiving the corresponding indicator, the UE may activate BWP #2 4-10 according to the content of the indicator. Here, a transition time 4-20 for switching the bandwidth part may be required, and accordingly, a time point when the active bandwidth part is switched and applied may be determined. FIG. 4 illustrates a case in which the transition time 4-20 of one slot is taken after the configuration switching indicator 4-15 is received. Data transmission or reception may not be performed during the transition time 4-20 (indicated by reference numeral 4-60). Accordingly, bandwidth part #2 4-10 is activated in slot #2 4-35 and slot #3 4-40 and thus control channel or data transmission or reception may be performed through the corresponding bandwidth part.

The base station may preconfigure one or multiple bandwidth parts for the UE via higher layer signaling (e.g., RRC signaling), and the configuration switching indicator 4-15 may indicate activation, by mapping to one of the bandwidth part configurations preconfigured by the base station. For example, an indicator of $\log_2 N$ bits may select and indicate one of N preconfigured bandwidth parts. [Table 3] below is an example of indicating configuration information for a bandwidth part by using a 2-bit indicator.

TABLE 3

| Indicator value | Bandwidth part configuration |
|---|---|
| 00 | Bandwidth part configuration A configured via higher layer signaling |
| 01 | Bandwidth part configuration B configured via higher layer signaling |
| 10 | Bandwidth part configuration C configured via higher layer signaling |
| 11 | Bandwidth part configuration D configured via higher layer signaling |

The configuration switching indicator 4-15 for the bandwidth part described in FIG. 4 may be transferred from the base station to the UE in the form of medium access control (MAC) control element (CE) signaling or L1 signaling (e.g., common DCI, group-common DCI, and UE-specific DCI).

According to the configuration switching indicator 4-15 for the bandwidth part described in FIG. 4, the time point at which the bandwidth part activation is to be applied may be determined as follows. The time point the configuration switch is to be applied may be determined based on a predefined value (for example, applied after N(≥1) slots after receiving the configuration switching indicator), may be configured by the base station for the UE via higher layer signaling (e.g., RRC signaling), or may be partially included in the content of the configuration switching indicator 4-15 and transmitted. Alternatively, the time point at which a configuration switch is applied may be determined by a combination of the above methods. After receiving the configuration switching indicator 4-15 for the bandwidth part, the UE may apply the switching configuration from the time point obtained by the above method.

Figure 5:
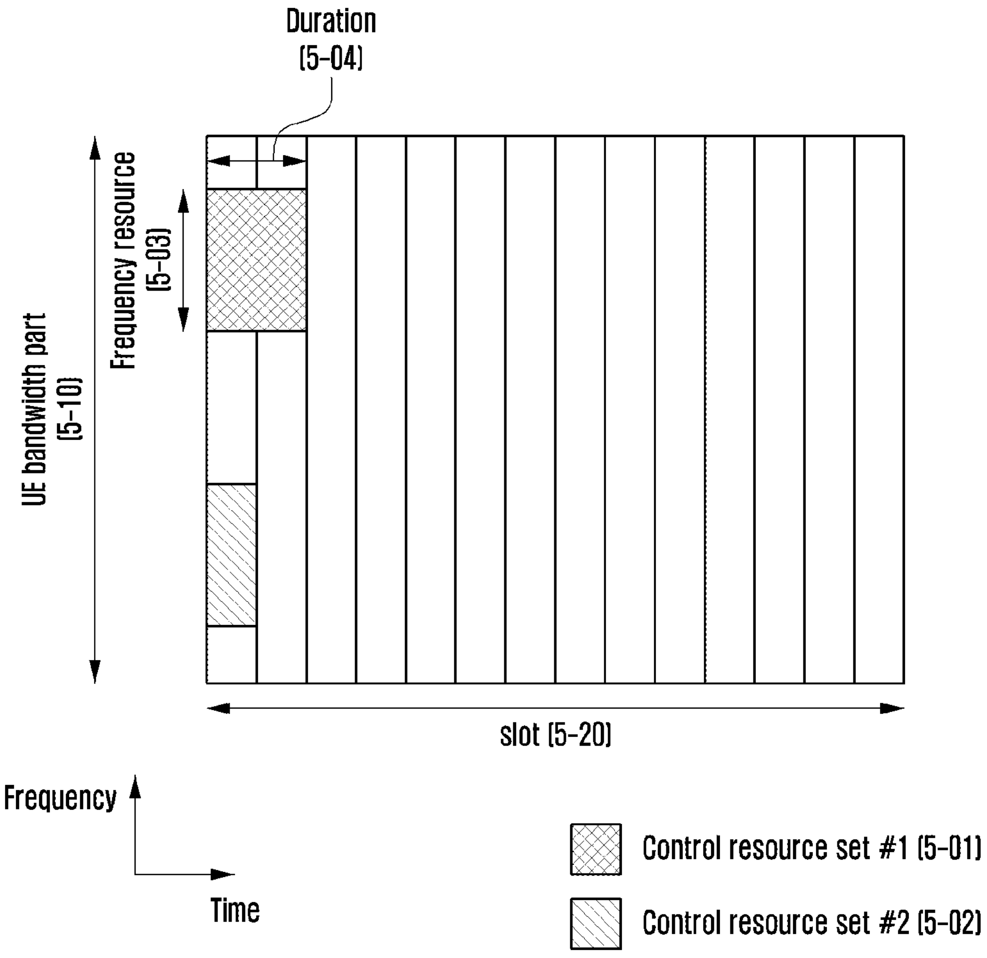
FIG. 5 illustrates a control resource set (CORESET) through which a downlink control channel is transmitted in a 5G system according to example embodiments of the disclosure.

FIG. 5 illustrates a control resource set (CORESET) through which a downlink control channel is transmitted in an example 5G system according to an example embodiment of the disclosure.

Referring to the example in FIG. 5, a UE bandwidth part 5-10 is configured in a frequency domain and two control resource sets (CORESET #1 5-01 and CORESET #2 5-02) are configured in 1 slot 5-20 in a time domain. The control resource sets 5-01 and 5-02 may be configured in a specific frequency resource 5-03 within the entire UE bandwidth part 5-10 in the frequency domain. The control resource sets 5-01 and 5-02 may be configured with one or multiple OFDM symbols in the time domain, and this may be defined as a control resource set duration 5-04. Referring to the example illustrated in FIG. 5, the CORESET #1 5-01 is configured with the control resource set duration of two symbols, and the CORESET #2 5-02 is configured with the control resource set duration of one symbol.

The above described control resource set in the 5G system may be configured for the UE by the base station via higher layer signaling (e.g., system information, master information block (MIB), or radio resource control (RRC) signaling). The configuration of the control resource set for the UE may be understood as providing information such as a control resource set identity, a frequency position of the control resource set, a symbol length of the control resource set, and the like. The information for configuration of the control resource set for the UE may include, for example, pieces of information according to Table 4-1.

TABLE 4-1

```
ControlResourceSet ::=                SEQUENCE {
  -- Corresponds to L1 parameter 'CORESET-ID'
  controlResourceSetId                  ControlResourceSetId,
  frequencyDomainResources              BIT STRING (SIZE (45)),
  duration                            INTEGER (1..maxCoReSetDuration),
  cce-REG-MappingType                     CHOICE {
      interleaved                         SEQUENCE {
      reg-BundleSize                      ENUMERATED {n2, n3, n6},
      precoderGranularity                    ENUMERATED {sameAsREG-bundle,
    allContiguousRBs},
      interleaverSize                     ENUMERATED {n2, n3, n6}
      shiftIndex                      INTEGER(0..maxNrofPhysicalResourceBlocks-1)
    },
    nonInterleaved                        NULL
  },
  tci-StatesPDCCH                       SEQUENCE(SIZE (1..maxNrofTCI-
    StatesPDCCH)) OF TCI-StateId              OPTIONAL,
  tci-PresentInDCI                      ENUMERATED {enabled}
}
```

In Table 4-1, the tci-StatesPDCCH (or simply TCI state) configuration information may include information on one or multiple synchronization signal (SS)/physical broadcast channel (PBCH) block(s) (referred to as SSB or SS/PBCH block) index, which is in a quasi-co-located (QCL) relationship with a demodulation reference signal (DMRS) transmitted in the corresponding control area or channel state information reference signal (CSI-RS) index.

In a wireless communication system, one or more different antenna ports may alternatively be one or more channels, signals, and combinations thereof, but in the example description of the disclosure in the future, for convenience, these are collectively referred to as 'different antenna ports' that may be associated with each other by the QCL configuration as shown in Table 4-2 below.

TABLE 4-2

```
QCL-Info ::=          SEQUENCE {
  cell                  ServCellIndex
  bwp-Id                BWP-Id
  referenceSignal       CHOICE {
    csi-rs                NZP-CSI-RS-ResourceId,
    ssb                   SSB-Index
  },
  qcl-Type              ENUMERATED {typeA, typeB, typeC, typeD},
  . . .
}
```

Specifically, a QCL configuration may connect two different antenna ports in a relationship of a (QCL) target antenna port and a (QCL) reference antenna port, and the UE may apply (or assume) all or some of the statistical characteristics of the channel measured at the reference antenna port (e.g., large scale parameters of the channel, such as Doppler shift, Doppler spread, average delay, delay spread, average gain, spatial Rx (or Tx) parameters, and the like, or a reception spatial filter coefficient or transmission spatial filter coefficient of the UE) during reception to the target antenna port.

The target antenna port refers to an antenna port for transmitting the channel or signal configured through higher layer configuration including the QCL configuration, or an antenna port for transmitting the channel or signal to which a TCI state indicating the QCL configuration is applied.

The reference antenna port refers to an antenna port for transmitting the channel or signal indicated (specified) by the parameter 'referenceSignal' in the QCL configuration.

Specifically, the statistical characteristics of a channel defined by the QCL configuration (indicated by a parameter qcl-Type in the QCL configuration) may be classified as follows according to the QCL type.

'QCL-TypeA': {Doppler shift, Doppler spread, average delay, delay spread}

'QCL-TypeB': {Doppler shift, Doppler spread}

'QCL-TypeC': {Doppler shift, average delay}

'QCL-TypeD': {Spatial Rx parameter}

The QCL types are not limited to the above four types, and not all possible combinations are listed.

In the above, QCL-TypeA is a QCL type used when all statistical characteristics measurable in the frequency and time axes can be referenced since both the bandwidth and transmission section of a target antenna port are sufficient compared to those of a reference antenna port (that is, in case that the number of samples and the transmission band/time of the target antenna port on both the frequency axis and the time axis are greater than the number of samples and the transmission band/time of the reference antenna port).

QCL-TypeB is a QCL type used when the bandwidth of a target antenna port is sufficient to measure statistical characteristics, which are measurable on the frequency axis, that is, Doppler shift and Doppler spreads.

QCL-TypeC is a QCL type used when only first-order statistics, that is, Doppler shift and average delay can be referenced since the bandwidth and transmission section of a target antenna port are insufficient to measure second-order statistics, that is, Doppler spread and delay spreads.

QCL-TypeD is a QCL type configured when spatial reception filter values used when receiving a reference antenna port can be used when receiving the target antenna port.

On the other hand, the base station can configure or indicate up to two QCL configurations in one target antenna port through the following TCI state configuration as shown in [Table 4-3].

TABLE 4-3

```
TCI-State ::=                       SEQUENCE {
  tci-StateId                         TCI-StateId,
  qcl-Type1                           QCL-Info,
  qcl-Type2                           QCL-Info
OPTIONAL,    -- Need R
  . . .
}
```

The first QCL configuration among two QCL configurations included in one TCI state configuration may be configured to be one of QCL-TypeA, QCL-TypeB, and QCL-TypeC. Here, the configurable QCL type is specified according to the types of the target antenna port and the reference antenna port, and will be described in detail below. In addition, the second QCL configuration among two QCL configurations included in the one TCI state configuration may be configured to be QCL-TypeD, and may be omittable in some cases.

Figure 6:
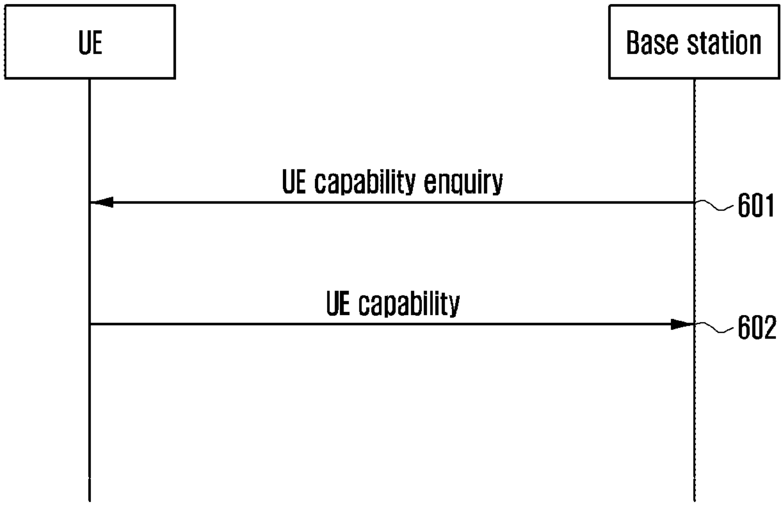
FIG. 6 illustrates a procedure of reporting UE capability according to example embodiments of the disclosure.

FIG. 6 illustrates a procedure of reporting a UE capability according to example embodiments of the disclosure.

In LTE and NR systems, a UE may perform a procedure of reporting the UE-supported capability to the corresponding base station while being connected to a serving base station. In the description below, this is referred to as a UE capability report.

The base station may transmit a UE capability enquiry message requesting a capability report to a UE which is in a connected state, in operation 601. The UE capability enquiry message may include a UE capability request for each RAT type. The request for each RAT type may include frequency band information for requesting UE capability.

Further, the UE capability enquiry message may include multiple RAT types in one RRC message container. Alternatively, according to another embodiment, the UE capability enquiry message including a request for each RAT type may be transmitted multiple times to the UE. That is, the UE capability enquiry may be repeatedly transmitted multiple times, and the UE may configure a UE capability information message corresponding to the repeated UE capability enquiry and make multiple reports of the UE capability information message.

In the NR system, the base station may request UE capability for MR-DC including NR, LTE, and EN-DC. The base station may transmit the UE capability inquiry message after the UE establishes a connection with the base station, and may request the UE capability reporting under any condition if the base station needs.

The UE, which has received a request for a UE capability report from the base station, may configure or acquire UE capability according to frequency band information and a RAT type, which are included in the UE capability inquiry message.

Meanwhile, according to an example embodiment of the disclosure, the UE capability may include information on whether or not the UE supports multi-TRP operation. In addition, the UE capability may include information on whether the UE supports multi-TRP operation for inter-cell. Accordingly, the UE capability may be referred to as multi-TRP related capability.

After the UE capability is configured, the UE may transmit a UE capability information message including the UE capability to the base station in operation 602. Based on the UE capability received from the UE, the base station may then perform appropriate scheduling and transmission/reception management for the corresponding UE.

Figure 7:
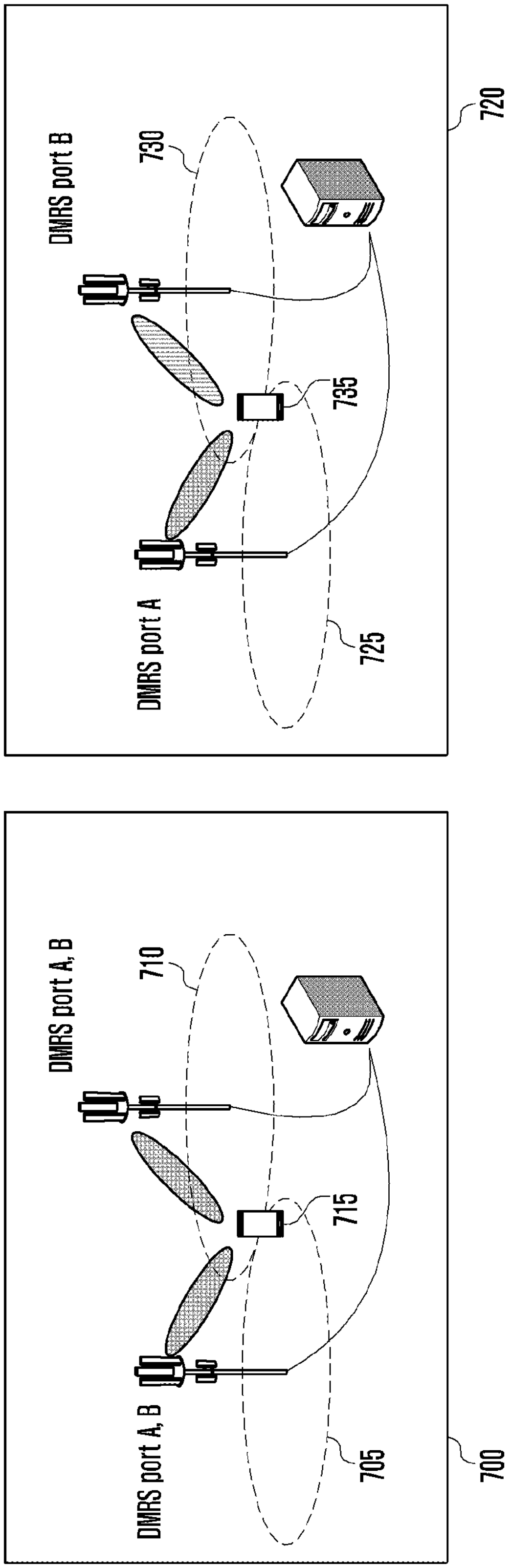
FIG. 7 illustrates the configuration of a coordinated communication antenna port according to example embodiments of the disclosure.

FIG. 7 illustrates the configuration of a coordinated antenna port according to example embodiments of the disclosure.

Referring to FIG. 7, an example of radio resource allocation for each transmission reception point (TRP) according to a joint transmission (JT) scheme and a situation is illustrated.

In FIG. 7, reference numeral 700 illustrates coherent joint transmission (C-JT) supporting coherent precoding between respective cells, TRPs, and/or beams. In the case of C-JT, TRP A 705 and TRP B 710 may transmit the same data (PDSCH), and joint precoding may be performed in multiple TRPs. This may be understood as that the same DMRS ports are transmitted in the TRP A 705 and TRP B 710 (for example, DMRS ports A and B are transmitted in both TRPs). In this case, a UE 715 may receive one piece of DCI information for receiving one PDSCH demodulated by a reference signal received through the DMRS ports A and B.

In FIG. 7, reference numeral 720 illustrates non-coherent joint transmission (NC-JT) supporting non-coherent precoding between respective cells, TRPs, and/or beams. In the case of NC-JT, different PDSCHs may be transmitted in respective cells, TRPs, and/or beams, and individual precoding may be applied to each PDSCH. This may be understood as that TRP A 725 and TRP B 730 may transmit different DRMS ports (for example, TRP A transmits DMRS port A and TRP B transmits DMRS port B). In this case, the UE 735 may receive two types of DCI information for receiving PDSCH A demodulated by DMRS port A and PDSCH B demodulated by another DMRS port B.

In order to support NC-JT for transmitting data to a UE at two or more transmission points at the same time, it is necessary to allocate the PDSCHs transmitted at two (or more) different transmission points through a single PDCCH or allocate the PDSCHs transmitted at two or more different transmission points through multiple PDCCHs. The UE may acquire a quasi-co-location (QCL) connection relationship between respective reference signals or between channels, based on L1/L2/L3 signaling and efficiently estimate the large-scale parameters of each reference signal or channel according thereto. If the transmission point of a reference signal or channel is different, it is difficult for the large-scale parameters to be shared with each other. Therefore, the base station needs to simultaneously notify the UE of quasi co-location information about two or more transmission points through two or more TCI states when performing coordinated transmission.

If the non-coherent coordinated transmission is supported through multiple PDCCHs, that is, in case that two or more PDCCHs allocate two or more PDSCHs to the same serving cell and the same bandwidth part at the same time, the two or more TCI states may be allocated to the respective PDSCHs or DMRS ports through the respective PDCCHs. On the other hand, if the non-coherent coordinated transmission is supported through a single PDCCH, that is, in case that one PDCCH allocates two or more PDSCHs to the same serving cell and the same bandwidth part at the same time, the two or more TCI states may be allocated to the respective PDSCHs or DMRS ports through a single PDCCH.

If it is assumed that the DMRS ports allocated to the HE at a specific time point are divided into DMRS port group A transmitted at transmission point A and DMRS port group B transmitted at transmission point B, the two or more TCI states may be connected to the respective DMRS port groups to estimate channels, based on different QCL assumptions for the respective groups. Meanwhile, different DMRS ports may be code-division-multiplexed (CDM), frequency-division-multiplexed (FDM), or time-domain-multiplexed (TDM) in order to increase the channel measurement accuracy and reduce transmission burden. If the DMRS ports to be CDMed among the above DMRS ports are collectively referred to as a ‘CDM group’, it may be important to ensure that the DMRS ports existing in the same CDM group do not have different TCI states because when the DMRS ports in the CDM group have similar characteristics of channels for the respective ports, the code-based multiplexing is performed well (that is, in the case where the characteristics of channels for the respective ports are similar, distinction using an orthogonal cover code (OCC) may be performed).

Meanwhile, the operation of transmitting data through multiple TRPs as described above may be referred to as a multi-TRP (M-TRP) operation. In addition, an operation of transmitting data through multiple cells in the multiple TRPs may be referred to as an inter-cell multi-TRP operation. Example embodiments of the disclosure propose methods for the inter-cell multi TRP operation.

For inter-cell multi-TRP (M-TRP) operation, a method for configuring inter-cell is required. For example, the inter-cell may be configured through inter-cell configuration information, and the inter-cell configuration information may include at least one type of information such as a unit and method for configuring inter-cell, a unit and method for grouping cells, and information for identifying the cell (e.g., cell id or serving cell id). However, example embodiments of the disclosure are not limited thereto, and the above-described information may not be included in the inter-cell configuration information, and any information related to the inter-cell may be included therein. In addition thereto, SSB pattern (ssb-PositionsInBurst, ssb-periodicityServingCell), sub-carrier spacing (subcarrier Spacing), frequency (absoluteFrequencySSB), etc. may be included therein.

Further, the inter-cell configuration information may also be referred to as configuration information, cell configuration information, or the like, as terms referring to cell configuration information for inter-cell coordinated transmission. In addition, example embodiments of the disclosure may be applied to inter-cell multi-TRP coordinated transmission through serving cells and inter-cell multi-TRP coordinated transmission through serving cells and non-serving cells.

FIGS. 8A to 8D are diagrams illustrating scenarios of configuring multi-TRP according to example embodiments of the disclosure.

Figure 8A:
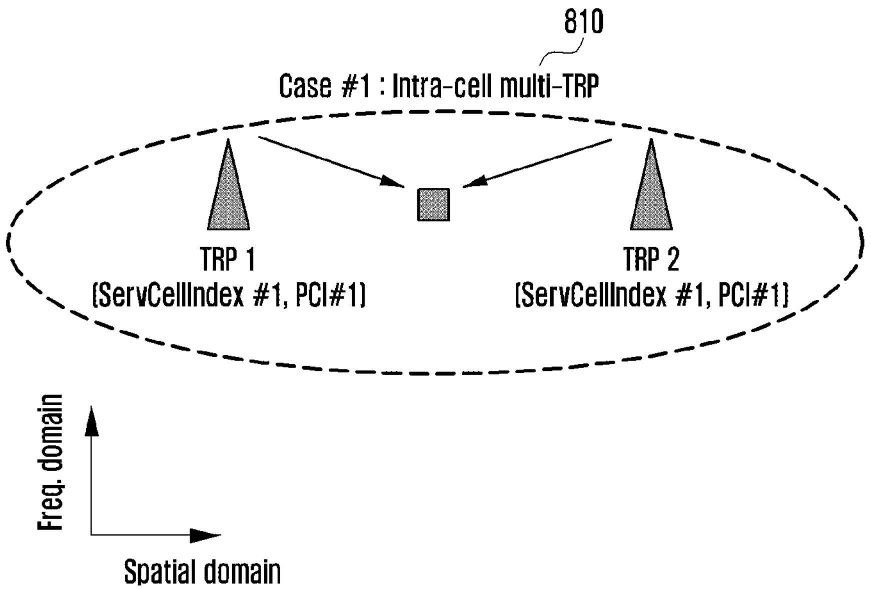
FIG. 8A illustrates a scenario of configuring multi-TRP according to example embodiments of the disclosure.

Referring to FIG. 8A, FIG. 8A illustrates an intra-cell multi-TRP operation 810 in which one or more TRPs operate within one serving cell configuration. According to FIG. 8A, since the base station transmits configuration for channels and signals transmitted in different TRPs by including the same in one serving cell configuration, several TRPs are operated based on one ServingCellIndex. Accordingly, since there is one ServingCellIndex, a cell may be configured using the same physical cell Id. In this situation, a method of differentiating inter-cell resources in frequency-domain (e.g., frequency/channel/band) resources or allocating different inter-cell resources in time-domain resources in order for the UE to distinguish cells is required. However, it may be more resource efficient to use all allocated resources in one component carrier (CC), and thus a method of distinguishing cells in the form of cell IDs, rather than distinguishing cells in terms of time and frequency resources, may be used during cell planning.

Therefore, example embodiments of the disclosure proposes a method for configuring an inter-cell for a new M-TRP based on new cell ID information or the cell-related information (or may be referred to as coordinated cell configuration information, coordinated cell-related information, etc.). That is, the disclosure proposes a method of, when multiple TRPs perform inter-cell coordinated transmission, configuring this in the UE (that is, notify the UE that cells performing inter-cell coordinated transmission are related to different TRPs). Meanwhile, a method of using a cell ID will be described below as an example, but the disclosure is not limited thereto, and methods using a physical cell ID, a serving cell index, or separate different identifier may also be considered.

Hereinafter, an example method for configuring a cell or a cell group is proposed. A method for configuring a cell or a cell group may be configured differently according to the scenario and/or case. The example method according to FIGS. 8A to 8D may be used for inter-cell coordinated communication between base stations (inter-gNB) or within a base station (inter-gNB). In addition, the back-haul and front-haul of FIGS. 8A to 8D may be applied to both an ideal back-haul/front-haul and a non-ideal back-haul/front-haul. In addition, FIGS. 8A to 8D may be applied between co-channels or between different channels, and may also be applied to different cell IDs or the same cell ID.

Figure 8B:
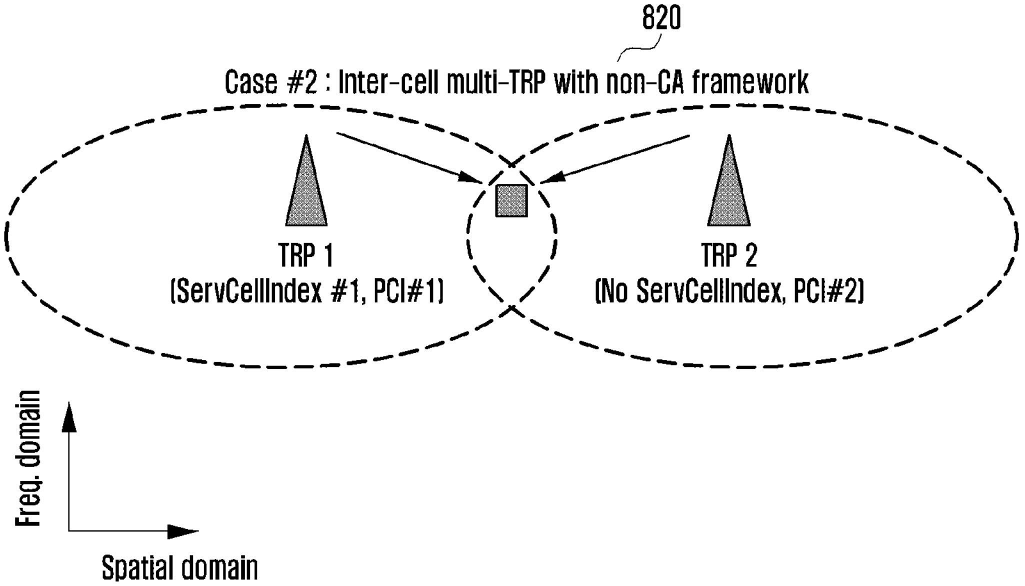
FIG. 8B illustrates a scenario of configuring multi-TRP according to example embodiments of the disclosure.
Figure 8C:
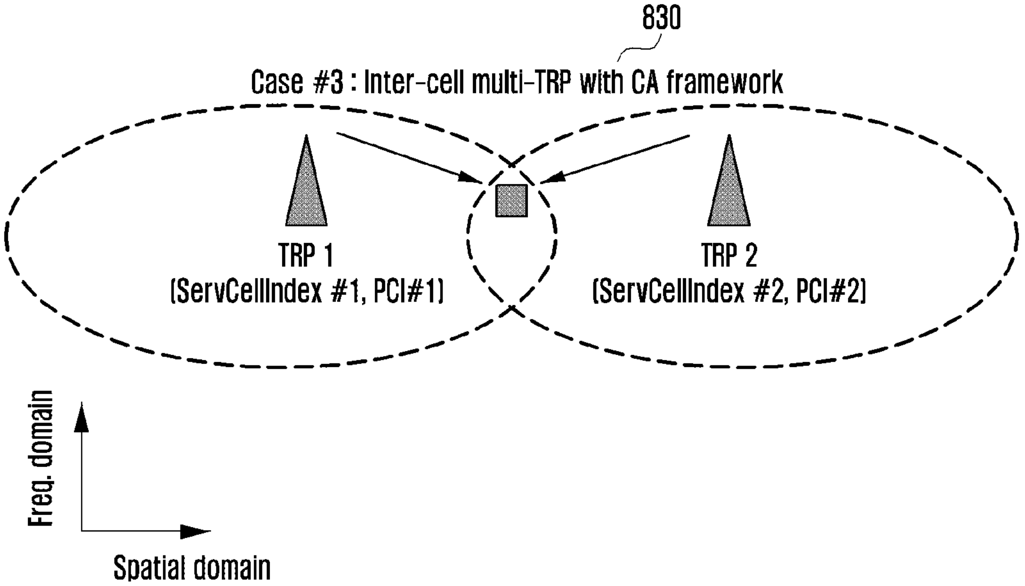
FIG. 8C illustrates a scenario of configuring multi-TRP according to example embodiments of the disclosure.

Referring to FIG. 8C first, FIG. 8C (example case 3) illustrates an inter-cell M-TRP operation 830 in a CA-framework.

According to FIG. 8C, the base station may be configured to include configuration for channels and signals transmitted in different TRPs in different serving cell configurations. In other words, each of TRPs has an independent serving cell configuration, and the frequency band values FrequencyInfoDLs indicated by DownlinkConfigCommon in each serving cell configuration may indicate at least some overlapping bands. Since multiple TRPs operate based on multiple ServCellIndexes (ServCellIndex #1, ServCellIndex #2), it is possible to use a separate PCI for each TRP (one PCI can be assigned per ServCellIndex). In this case, when various SSBs are transmitted in TRP 1 and TRP 2, the SSBs have different PCI values (PCI #1 or PCI #2), and the UE may receive the PCI values by distinguishing therebetween.

Specifically, an example method for configuring coordinated transmission in multiple TRPs using cell configuration information is as follows.

Method 1: Referring to Table 5 below, configuring information indicating activation or deactivation of inter-cell multi-TRP information (IntercellForMultiTRP) in SpCell configuration information (SpCellConfig) may be considered. In this case, the following IntercellForMultiTRP information may be configured in a manner indicating activation or deactivation with 1-bit information,_indicating activation when IntercellForMultiTRP information is included, and indicating deactivation when IntercellForMultiTRP information is not included. As such, by using ServCellIndex, inter-cell M-TRP may operate based on a CA-framework.

Accordingly, the UE may determine that the SCell or SpCell in which the IntercellForMultiTRP is configured as enabled (or having IntercellForMultiTRP included) is configured as a cooperating set to perform coordinated transmission.

TABLE 5

```
-- Serving cell specific MAC and PHY parameters for a SpCell:
SpCellConfig ::=                          SEQUENCE {
  servCellIndex                           ServCellIndex
OPTIONAL,   -- Cond SCG
  reconfigurationWithSync                 ReconfigurationWithSync
OPTIONAL,   -- Cond ReconfWithSync
  rlf-TimersAndConstants                  SetupRelease
                                          { RLF-TimersAndConstants }
OPTIONAL,   -- Need M
  rlmInSyncOutOfSyncThreshold             ENUMERATED {n1}
OPTIONAL,   -- Need S
  spCellConfigDedicated                   ServingCellConfig
OPTIONAL,   -- Need M
  IntercellForMultiTRP                    ENUMERATED {enable,
                                          disable}
OPTIONAL,   -- Need M
  . . .
}
```

lthough SpCellConfig has been described as an example in the above, the disclosure is not limited thereto, and the same may be applied to SCell configuration information (SCellConfig).

Method 2: In another example embodiment, configuring the IntercellForMultiTRP using ServingCellConfig as shown in Table 6 may be considered.

As described above, IntercellForMultiTRP may be configured in a manner of indicating activation or deactivation with 1-bit information, indicating activation when IntercellForMultiTRP information is included, and indicating deactivation when IntercellForMultiTRP information is not included. Accordingly, when IntercellForMultiTRP is configured as enable in the ServingCellConfig (or when IntercellForMultiTRP is included in the ServingCellConfig), the UE may determine that the SCells or SPCells corresponding to the ServingCellConfig perform coordinated transmission.

TABLE 6

```
ServingCellConfig ::=                      SEQUENCE {
  tdd-UL-DL-ConfigurationDedicated           TDD-UL-DL-ConfigDedicated
OPTIONAL,   -- Cond TDD
  initialDownlinkBWP                         BWP-DownlinkDedicated
OPTIONAL,   -- Need M
  downlinkBWP-ToReleaseList                  SEQUENCE (SIZE (1..maxNrofBWPs))
                                             OF BWP-Id
OPTIONAL,   -- Need N
  downlinkBWP-ToAddModList                   SEQUENCE (SIZE (1..maxNrofBWPs))
                                             OF BWP-Downlink
OPTIONAL,   -- Need N
. . .
  IntercellForMultiTRP                     ENUMERATED {enable, disable}
OPTIONAL,   -- Need M
```

Method 3: In another example embodiment, coordinated cell-related information may be transmitted using higher layer signaling (RRC) for inter-cell-based multiple TRP transmission. The coordinated cell-related information may be included in CellGroupConfig as shown in Table 7 below, for example, at least one information of inter-cell group information for multi-TRP (hereinafter, InterCellGroupForMultiTRP) and TRP group ID (hereinafter, InterCellGroupForMultiTRPGroupID) may be added to the CellGroupConfig.

However, embodiments of the disclosure are not limited thereto. That is, the coordinated cell-related information may be configured by being included in the aforementioned SpCellConfig, SCellConfig, ServingCellConfig, and the like.

TABLE 7

```
-- Configuration of one Cell-Group:
CellGroupConfig ::=                          SEQUENCE {
  cellGroupId                                  CellGroupId,
  rlc-BearerToAddModList                       SEQUENCE (SIZE(1..maxLC-ID)) OF RLC-
BearerConfig
  rlc-BearerToReleaseList                      SEQUENCE (SIZE(1..maxLC-ID)) OF
LogicalChannelIdentity
  mac-CellGroupConfig                          MAC-CellGroupConfig          OPTIONAL,
Need M
  physicalCellGroupConfig                      PhysicalCellGroupConfig      OPTIONAL,
Need M
  spCellConfig                                 SpCellConfig                 OPTIONAL,
Need M
  sCellToAddModList                            SEQUENCE (SIZE (1..maxNrofSCells)) OF
  sCellToReleaseList                           SEQUENCE (SIZE (1..maxNrofSCells)) OF
SCellIndex
  . . . ,
  dormancySCellGroups                          DomancySCellGroups           OPTIONAL,
Need N
  InterCellGroupsForMultiTRP                   InterCellGroupsForMultiTRP   OPTIONAL,
Need N
. . .
}
InterCellGroupForMultiTRP-r17 :: =             SEQUENCE {
  InterCellGroupForMultiTRPGroupID-r17         InterCellGroupForMultiTRPGroupID-r17,
  InterCellGroupForMultiTRPSCellList-r17       SEQUENCE (SIZE (1..maxNrofSCells)) OF
SCellIndex
}
InterCellGroupForMultiTRPGroupID-r17 ::=         INTEGER (0..5)
//Generate groups as many as the number of adjacent cells
```

For example, the InterCellGroupForMultiTRP may be included in CellGroupConfig, and the InterCellGroupForMultiTRP may include InterCellGroupForMultiTRPGroupID and InterCellGroupForMultiTRPSCellList. Accordingly, SCells included in InterCellGroupForMultiTRPSCellList are grouped by InterCellGroupForMultiTRPGroupID, and the SCells or SPCells may be used for coordinated transmission.

Here, referring to Table 7, at least one of 0 to 5 may be selected for InterCellGroupForMultiTRPGroupID. However, this is only an example embodiment of the disclosure, that is, the InterCellGroupForMultiTRPGroupID may be configured to be a value of 5 or more according to the number of TRP groups.

Alternatively, only InterCellGroupForMultiTRPGroupID may be included in CellGroupConfig. In this case, Scells corresponding to ScellConfig included in CellGroupConfig may have the same TRP Group ID. Therefore, a cell or cell groups having the same TRP Group ID may be used for coordinated transmission. As such, the cooperating set of the inter-cell-based M-TR may be configured by using or combining the two methods.

Method 4: In another example embodiment, coordinated cell-related information may be transmitted using higher layer signaling (RRC) for inter-cell-based multiple TRP transmission, and a set configuring a CellGroup may be defined in a list or table form of (physical ID #X, physical Id #Y) or (servicellId #X, servicellId #Y).

A set of physical cell IDs or a set of servingcellIDs may be configured in CellGroup, and the set may be used for coordinated transmission. In this case, the set of the physical cell ID or the set of servingcellID may be configured through SpCellConfig, SCellConfig, ServingCellConfig, etc., in addition to CellGroupConfig.

Figure 8D:
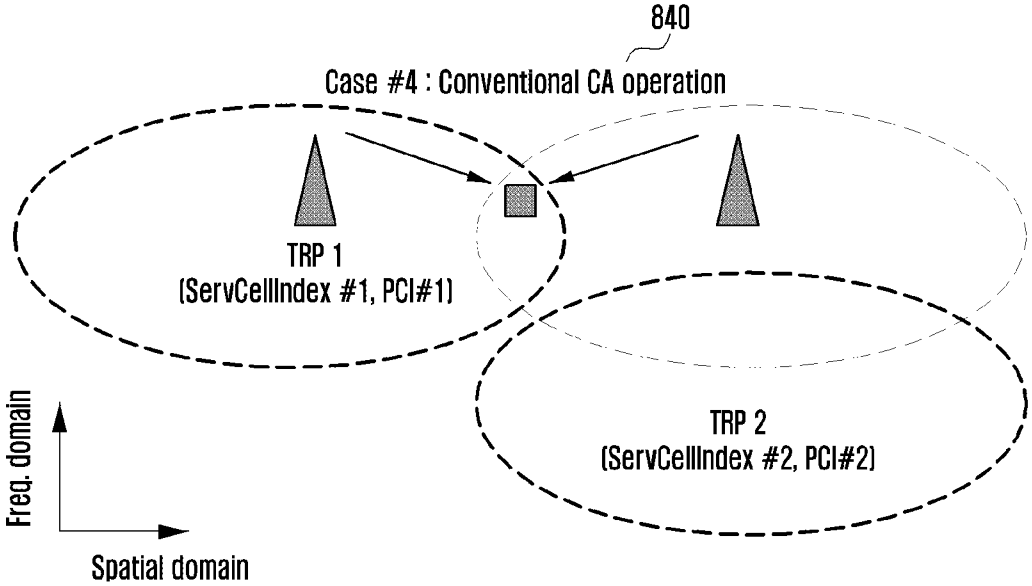
FIG. 8D illustrates a scenario of configuring multi-TRP according to example embodiments of the disclosure.

FIG. 8D illustrates an example 840 of a serving cell and PCI configuration according to a CA operation.

Referring to FIG. 8D, the base station may configure different serving cells (ServCellConfigCommon) for each cell in a CA situation in which the frequency resources occupied by each cell are different (that is, frequency band values FrequencyInfoDL indicated by DownlinkConfigCommon in each serving cell configuration are different), and accordingly, different indexes (ServCellIndex) for each cell may be configured and different PCI values may be mapped thereto.

FIG. 8B (case 2) illustrates an example inter-cell M-TRP operation 820 in a non-CA framework.

Referring to FIG. 8B, configuration for channels and signals transmitted in different TRPs may be included in one serving cell configuration. Here, if different TRPs have different PCIs and are configured to have different PCIs without a separate serving cell index configuration, the UE may be configured to determine that inter-cell M-TRP transmission is performed.

However, since the inter-cell M-TRP operation operates based on the ServCellIndex, the UE may be configured not to identify a PCI allocated to a TRP for transmitting and receiving a signal through a non-serving cell. Accordingly, the UE may be configured not to identify whether inter-cell M-TRP transmission has been configured. Therefore, hereinafter, an example method of identifying the PCI of the TRP for transmitting and receiving a signal through a non-serving cell is proposed, and accordingly, the UE may be configured to identify whether the inter-cell M-TRP has been configured.

Method 1: an example method of adding a parameter, by which additional PCI values other than the first PCI value mapped to the existing ServCellIndex can be connected, to the TCI configuration or QCL configuration, and configuring the SSB based on the additional PCI as a QCL reference antenna port may be used.

Specifically, as shown in Table 8 below, a parameter for referring to a different PCI other than the PCI allocated to the corresponding serving cell may be added to the QCL configuration.

TABLE 8

```
QCL-Info ::=        SEQUENCE {
  cell                  ServCellIndex
  bwp-Id                BWP-Id
  referenceSignal       CHOICE {
    csi-rs                NZP-CSI-RS-ResourceId,
    ssb                   SSB-Index
  },
  qcl-Type              ENUMERATED {typeA, typeB, typeC, typeD},
 physCellId           PhysCellId
  . . .
}
```

Second example method: Alternatively, as shown in Table 9 below, a parameter for referring to different PCI other than the PCI allocated to the corresponding serving cell may be added to the TCI configuration.

TABLE 9

```
TCI-State ::=                    SEQUENCE {
   tci-StateId                     TCI-StateId,
   qcl-Type1                       QCL-Info,
   qcl-Type2                       QCL-Info
OPTIONAL,   -- Need R
  physCellId                       PhysCellId
   . . .
}
```

Third example method: Alternatively, when different PCI values are to be mapped to the first QCL configuration (qcl-Type1) and the second QCL configuration (qcl-Type2) in the TCI configuration, two PCIs (physCellId1, physCellId2) can be added to the TCI configuration as shown in Table 10.

TABLE 10

```
TCI-State ::=                        SEQUENCE {
      tci-StateId                      TCI-StateId,
      qcl-Type1                        QCL-Info,
      qcl-Type2                        QCL-Info
OPTIONAL,   -- Need R
   physCellId1                         PhysCellId
   physCellId2                         PhysCellId
      . . .
}
```

When allocating an additional PCI value in the QCL configuration or TCI configuration, it is possible to consider specific restrictions by considering the mobility configuration (or handover configuration) values of the UE.

The base station can use a black cell list or a white cell list within the measurement configuration (e.g., MeasConfig or MeasObject configuration). According to Table 11 below, the base station may configure a list of series of PCI values connected to the black list (blackCellsToAddModList) and white list (whiteCellsToAddModList) of the PCI values that the UE considers during measurement of the SSB through the MeasObject configuration.

TABLE 11

```
MeasObjectNR ::=                     SEQUENCE {
  ssbFrequency                           ARFCN-ValueNR
OPTIONAL, -- Cond SSBorAssociatedSSB
  ssbSubcarrierSpacing                   SubcarrierSpacing
OPTIONAL, -- Cond SSBorAssociatedSSB
  sntc1                                  SSB-MTC
OPTIONAL, -- Cond SSBorAssociatedSSB
  sntc2                                  SSB-MTCZ
OPTIONAL, -- Cond IntraFreqConnected
  refFreqCSI~RS                          ARFCN-ValueNR
OPTIONAL, -- Cond CSI-RS
  referenceSignalConfig                  ReferenceSignalConfig,
  absThreshSS-BlocksConsolidation        ThresholdNR
OPTIONAL, -- Need R
  absThreshCSI-RS-Consolidation          ThresholdNR
OPTIONAL, -- Need R
  nrofSS-BlocksToAverage                 INTEGER (2..MaxNrofSS-BlocksToAverage)
OPTIONAL, -- Need R
  nrofCSI-RS-ResourcesToAverage          INTEGER (2..maxNrofCSI-RS-
ResourcesToAverage)                  OPTIONAL, -- Need R
  quantityConfigIndex                    INTEGER (1..maxNrofQuantityConfig),
  offsetMO                               Q-OffsetRangeList,
  cellsToRemovelist                      PCI-List
OPTIONAL, -- Need N
  cellsToAddModList                      CellsToAddModList
OPTIONAL, -- Need N
  blackcellsToRemovelist                 PCI-RangeIndexList
OPTIONAL, -- Need N
  blackCellsToAddModList                 SEQUENCE (SIZE (1..maxNrofPCI-Ranges)) OF
PCI-RangeElement     OPTIONAL,     -- Need N
  whiteCellsToRemoveList                 PCI-RangeIndexList
OPTIONAL, -- Need N
  whiteCellsToAddModList                 SEQUENCE (SIZE (1..maxNrofPCI-Ranges)) OF
PCI-RangeElement     OPTIONAL,     -- Need N
  ... ,
  [[
freqBandIndicatorNR-v1530                FreqBandIndicatorNR
OPTIONAL, -- Need R
  measCyclesCell-v1530                   ENUMERATED {sf160, sf256, sf320, sf512,
sf640, sf1024, sf1280}     OPTIONAL     -- Need R
  ]]
}
```

In the above example, when PCI #2 is included in whiteCellsToAddModList in MeasObjectNR (or not included in blackCellsToAddModList), but PCI #3 is not included in whiteCellsToAddModList in MeasObjectNR (or included in blackCellsToAddModList), the UE may be configured to identify that PCI #2 has been configured. Accordingly, the UE has an obligation to measure SSB for PCI #2, but has no obligation to measure SSB for PCI #3. Therefore, the UE can apply the QCL reference antenna port configuration to the SSB linked to PCI #2, but may not expect the QCL reference antenna port configuration with regard to the SSB linked to PCI #3. Here, "the UE does not expect the QCL reference antenna port configuration" can be variously applied as meaning that "if configured like this, the corresponding configuration is ignored", "the UE operation for the configuration is not defined and is allowed to perform random processing", or "the base station is guaranteed not to perform this configuration" in actual application.

In another example embodiment of the disclosure, the following example method may be used for the UE to identify whether the inter-cell M-TRP operation has been configured in FIG. 8B.

At least one or more BWPs may be configured for TRP 1 and TRP 2, and cell-related higher layer signaling or parameters may be configured. Multiple TRP(s) may be configured such that BWP corresponding to the inter-cell M-TRP is active among BWPs supported by the TRPs. Therefore, multiple BWPs may be active for M-TRP transmission. For example, for inter-cell M-TRP transmission, BWP-0 of TRP 1 may be configured to be associated with CORESET 0, 1, 2, 3, and 4, and BWP-1 of TRP 2 may be configured to be associated with CORESET 0, 1, 2, 3, 4. In addition, when BWP 0 of TRP 1 and BWP 1 of TRP 2 are activated, the UE may be configured to determine that the M-TRP operation has been configured. Accordingly, the UE may perform the M-TRP operation according to the ControlResourceSet configuration. That is, the UE may transmit or receive a signal through multiple TRPs.

On the other hand, the above-described measurement configuration information may be used to determine whether BWP-1 of TRP 2 related to the non-serving cell is in an activation state. The BWP-1 of the TPR 2 may be activated by including at least a part of the BWP-1 in the frequency information of the band included in the measurement configuration information received from the serving cell. For example, the measurement configuration information may include frequency information (e.g., ARFCN-ValueNR in ssbFrequency or freqbandindicatorNR), and when the frequency information is configured to include a part of the frequency information (BWP-1) of TRP 2, the BWP-1 of the TRP 2 may be activated. Alternatively, the measurement configuration information may include an activated BWP or BWP ID to be used for multi-TRP inter-cell transmission, and accordingly, multi-TRP inter-cell transmission may be performed.

In addition, the measurement configuration information received from the serving cell may include information such as a measurement object (servingCellMO) and measurement Id of the serving cell. In addition, the measurement configuration information received from the serving cell may include a measurement object related to a neighboring cell. The measurement object may include at least one of information such as BWP ID and cell ID. Accordingly, the UE may be configured to determine that BWP 0 of TRP 1 and BWP 1 of TRP 2 are activated according to the measurement object, and to perform an M-TRP operation. Alternatively, the measurement object may include information on CellsToAddModList, and the BWP 1 of TRP 2 may be activated by including a PCI list in the information.

Alternatively, the base station may be configured to transmit the BWP ID for performing multi-TRP inter-cell coordinated transmission to the UE through configuration information such as QCL information (QCL info), or transmit the BWP ID for BWP 1 of TRP 2 to the UE.

In another example embodiment of the disclosure, the following example method may be used for the UE to identify whether the inter-cell M-TRP operation is configured in FIG. 8B.

At least one BWP may be configured for TRP 1 and TRP 2, and a method of newly configuring a CORESET index configured in the UE may be considered. Multiple TRP(s) may each configure one or more BWPs and here, the same BWP-Id of each TRP for inter-cell M-TRP transmission may be configured to be associated with a consecutive number of CORESET index. For example, the UE may be configured to active the same BWP-Id from TRP 1 and TRP 2. If the maximum number of CORESET indexes is determined to be 5, the BWP-1 of TRP 1 may be configured to be associated with CORESETs 0, 1, and 2, and the BWP-1 of TRP 2 may be configured to be associated with CORESETs 3 and 4. For another example, if the maximum number of COREESET index is determined to be a value of 5 or more (e.g., 10), the BWP-1 of TRP 1 may be configured to be associated with CORESETs 0-4 and the BWP-1 of TRP 2 may be configured to be associated with CORESETs 5-9.

In addition, referring to Table 12 below, IntercellDownlinkBWP-Id may be added as follows to separately configure the active BWP Id. Accordingly, when the BWP indicated by the IntercellDownlinkBWP-Id is activated as described above, the UE may perform the inter-cell M-TRP operation in the corresponding BWP. When using this method, a non-CA framework operation can be performed while maintaining the current standard in which only one BWP is active in inter-cell-based multi-TRP transmission.

In Rel-16, up to five CORESETs may be configured within one BWP, and here, a set of CORESETs capable of performing multi-TRP transmission may be configured using the same CORESETPoolIndex. On the other hand, it is necessary to configure CORESETPoolIndex for each of multiple TRPs corresponding to inter-cells in Rel-17. Here, the base station may configure five or more CORESETs within one BWP, and for inter-cell-based multi-TRP transmission, may extend and use multiple existing CORESETPoolIndex and use new information (e.g., CORESETPoolIndex-rel17 or CORESETPoolIndexForIntercell).

Figure 9:
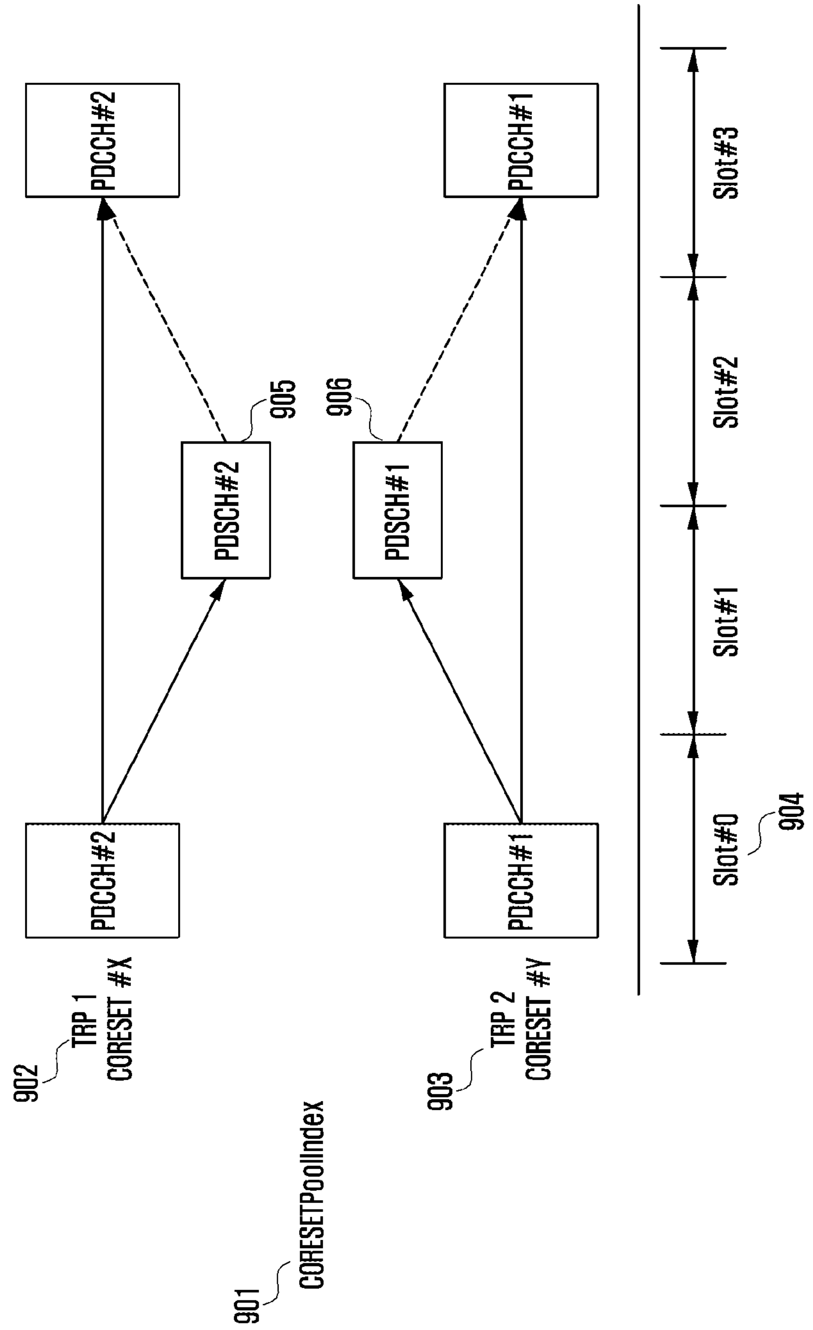
FIG. 9 illustrates a method for configuring CORESETPoolIndex of multi-DCI-based M-TRP according to example embodiments of the disclosure.

FIG. 9 illustrates an example method for configuring CORESETPoolIndex of multi-DCI-based M-TRP according to an example embodiment of the disclosure.

A UE may decode DCI by monitoring multiple PDCCHs included in CORESETs in which CORESETPoolIndex values are configured to have the same value in at least one BWP. In addition, the UE may expect to receive fully/partially/non-overlapped PDSCHs scheduled by the DCI.

For example, the UE may monitor CORESET #X 902 of TRP 1 and CORESET Y 903 of TRP #2 configured using the same CORESETPoolIndex 901 in slot #0 904, respectively. Accordingly, the UE may receive data through PDSCH #2 905 and PDSCH #1 906 based on the DCI received through CORESET #X and CORESET #Y.

Here, even if the PCIs configured in the TRP are different from each other, the UE may determine the CORESET index(s) configured by the multi-TRP only using the configured CORESETPoolIndex. To this end, an example method is proposed below. First, CORESETPoolIndex may be configured in the UE, and the UE may perform M-TRP operation through CORESET having the same CORESETPoolIndex. For example, in case that CORESETPoolIndex 0 includes CORESETs 1 and 2 and CORESETPoolIndex 1 includes CORESETs 3 and 4, the UE may perform an M-TRP operation through CORESETs 1 and 2, and may perform the M-TRP operation through CORESETs 3 and 4, respectively.

A first example method for configuring CORESETPoolIndex will be described. According to the first example method of the disclosure, when CORESETPoolIndex is configured for a serving cell, the UE may expect that the same CORESETPoolIndex is configured for an inter-cell (a non-serving cell). That is, the same CORESETPoolIndex may be applied even to the inter-cell. In this case, the UE may determine that implicit configuration for the inter-cell (non-serving cell) is established without a separate CORESETPoolIndex configuration.

TABLE 12

| | | |
|---|---|---|
| ServingCellConfig ::= | SEQUENCE { | |
| tdd-UL-DL-ConfigurationDedicated | TDD-UL-DL-ConfigDedicated | |
| OPTIONAL, -- Cond TDD | | |
| initialDownlinkBWP | BWP-DownlinkDedicated | |
| OPTIONAL, -- Need M | | |
| downlinkBWP-ToReleaseList | SEQUENCE (SIZE (1..maxNrofBWPs)) OF BWP-Id | |
| OPTIONAL, -- Need N | | |
| downlinkBWP-ToAddModList | SEQUENCE (SIZE (1..maxNrofBWPs)) OF BWP-Downlink | |
| OPTIONAL, -- Need N | | |
| firstActiveDownlinkBWP-Id | BWP-Id | |
| IntercellDownlinkBWP-Id | BWP-Id | //Designate BWP ID |
| ... | | |
| } | | |

Meanwhile, the configuration and operation of CORESET monitored by the UE in order to perform inter-cell-based multi-TRP transmission based on the above-described configuration will be described below. For a detailed configuration of CORESET, a new definition/change of RRC parameter CORESETPoolIndex is required.

For example, in case that, with regard to the cell for TRP 1, CORESETPoolIndex 0 is configured to include CORESETs 1 and 2, and CORESETPoolIndex 1 is configured to include CORESET 3 and 4, the UE may be configured to determine that the CORESETPoolIndex 0 includes CORESETs 1 and 2 and the CORESETPoolIndex 1 includes CORESETs 3 and 4, even with regard to the cell for TPR2.

Figure 10:
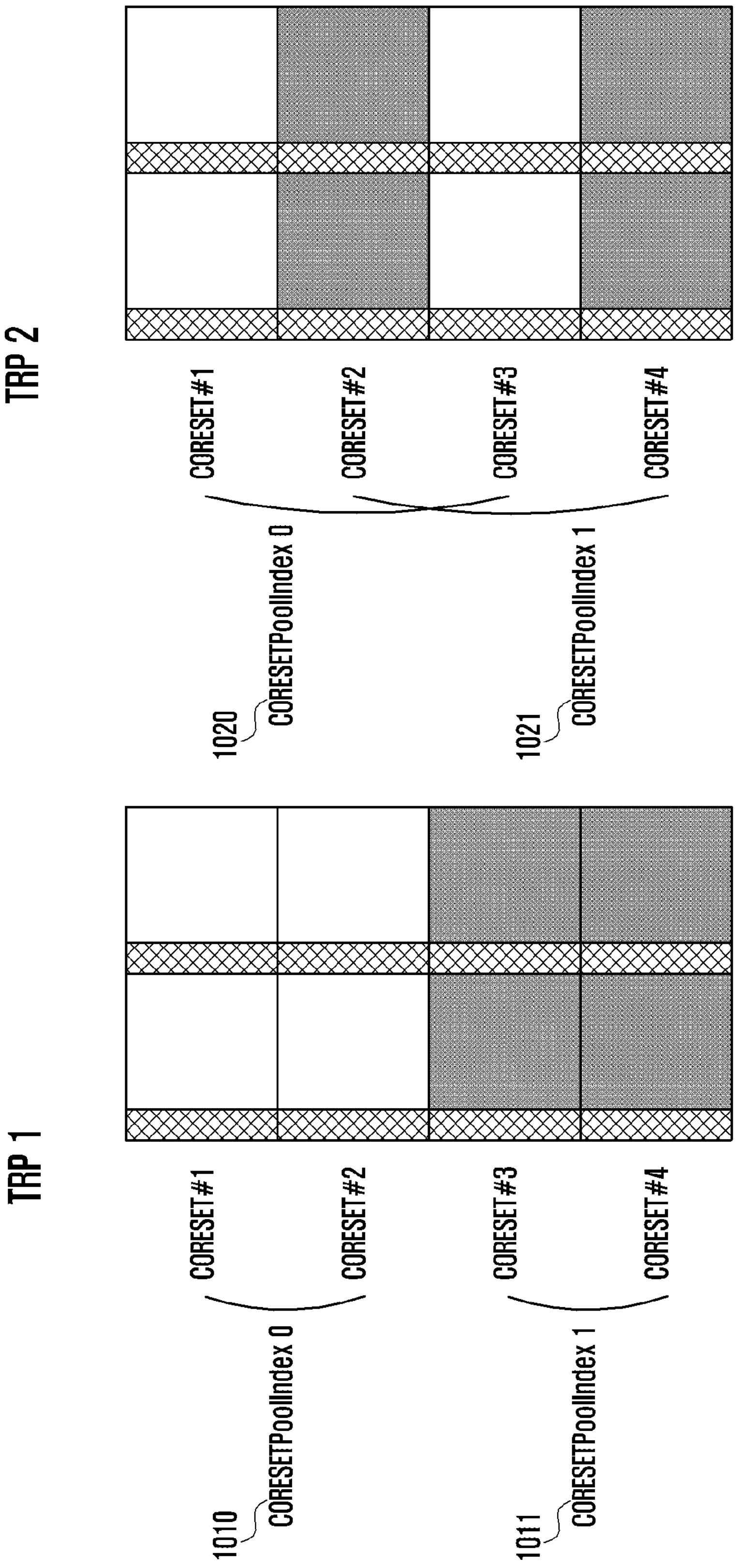
FIG. 10 illustrates a method for configuring CORESETPoolIndex according to example embodiments of the disclosure.

FIG. 10 illustrates a second example method for configuring CORESETPoolIndex according to an example embodiment of the disclosure.

In the second example method, the number of CORESETPoolIndex configurations may be fixed, and the disclosure describes a case in which the number of CORESETPoolIndex configurations is configured as two, for example. However, the embodiment of the disclosure is not limited thereto, and the number of configurations of CORESETPoolIndex may be changed. The base station may configure CORESETPoolIndex as 0 or 1 for each PCI. Here, there may be two or more CORESETs included in CORESETPoolIndex 0 or 1. According to the second example method, the base station may be configured to cause at least one CORESET to have the same index for each PCI, the CORESETs being pooled in order to configure the inter-cell CORESETPoolIndex. In addition, according to the second example method, with regard to TRP having the same PCI, at least two CORESETs may be included in CORESETPoolIndex, and CORESETs having the same CORESETPoolIndex may be used for inter-cell coordinated transmission.

For example, the base station may configure CORESET 1 for TRP 1 and CORESET 1 for TRP 2 as inter-cell CORESETPoolIndex 0 for a specific UE.

As another example, a PDCCH for multi-TRP transmission using the same CORESETIndex in an inter-cell may be monitored using CORESETPoolIndex configured in one intra-cell. Specifically, referring to FIG. 10, CORESET 1 for TRP 1 and CORESET 2 for TRP 1 may be configured using CORESETPoolIndex 0 1010 for TRP 1, and CORESET 1 for TRP 2 and CORESET 3 for TRP 2 may be configured using CORESETPoolIndex 0 1020 for TRP 2. Therefore, CORESETPoolIndex 0 for TRP 1 and TRP 2 may be used for PDCCH monitoring for inter-cell multi-TRP transmission. Similarly, CORESET 3 for TRP 1 and CORESET 4 for TRP 1 may be configured using CORESETPoolIndex 1 1011 for TRP 1, and CORESET 2 for TRP 2 and CORESET 4 for TRP 2 may be configured using CORESETPoolIndex 1 1021 for TRP 2. Therefore, CORESETPoolIndex 1 for TRP 1 and TRP 2 may be used for PDCCH monitoring for inter-cell multi-TRP transmission. Here, the UE may be configured to perform PDCCH monitoring for multi-TRP transmission by identifying only CORESETPoolIndex regardless of PCI. As such, the base station may configure or determine such that the total number of CORESETPoolIndex is fixed and the UE monitors all pools having the same index.

Specifically, information for configuring CORESET ID and CORESETPoolIndex in the second method may be shown in Table 13 below. Here, the number of CORESETPoolIndex is configured as two, for example, but the number of CORESETPoolIndex may be increased, and accordingly, the number of bits of the corresponding information may also be increased. On the other hand, the UE may operate assuming that CORESETPoolIndex is 0 if there is no separate value configuration in the RRC configuration.

TABLE 13

```
ControlResourceSet ::=          SEQUENCE {
    controlResourceSetId          ControlResourceSetId,
OPTIONAL,   -- Need S
. . .
```

TABLE 13-continued

```
  [[
    coresetPoolIndex-r17          INTEGER (0..1) //the number of
                                                 CORESETPoolIndex
OPTIONAL,   -- Need R                            is fixed at 1
    controlResourceSetId-r17      ControlResourceSetId-r16
OPTIONAL   -- Need S
    ]]
}
```

Figure 11:
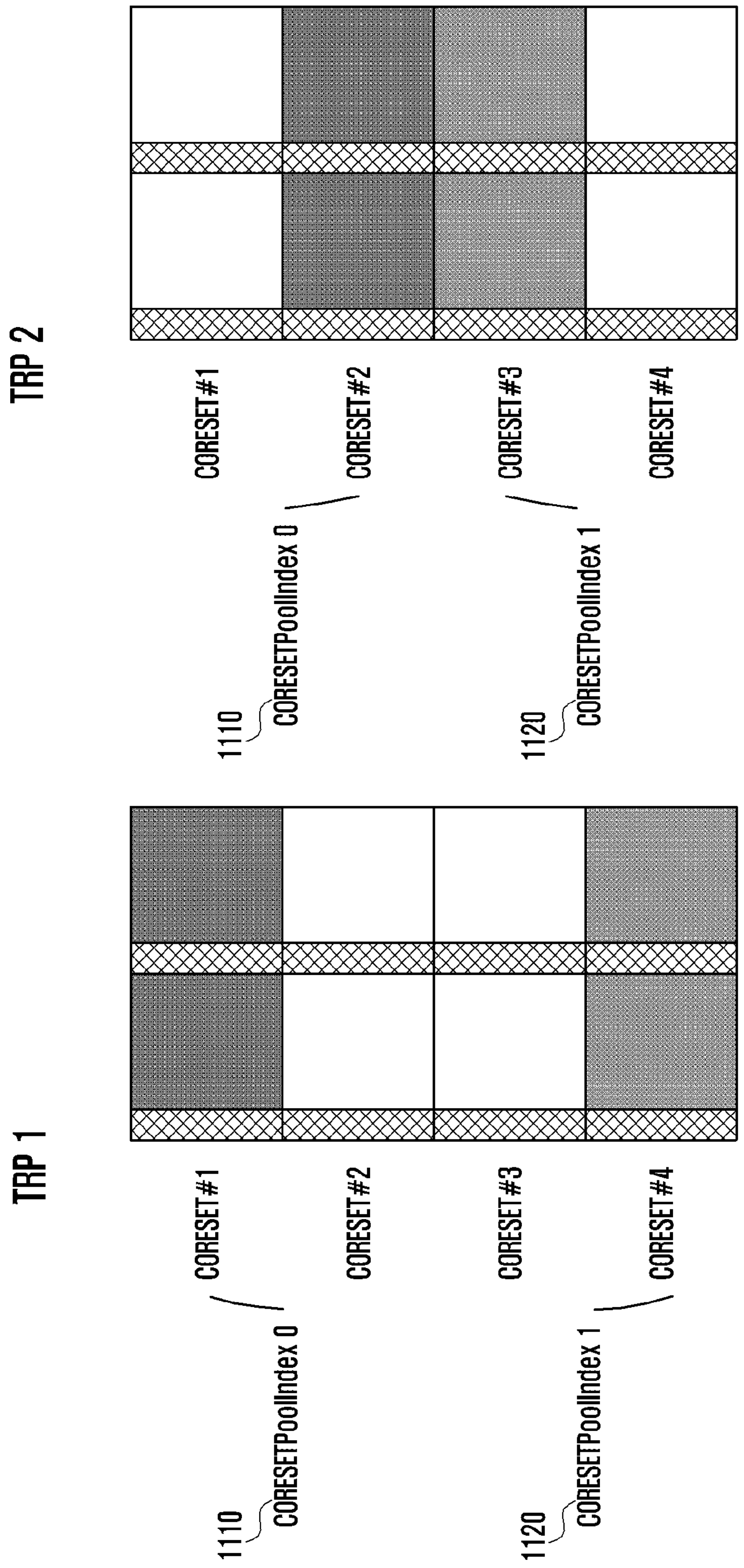
FIG. 11 illustrates a method for configuring CORESETPoolIndex according to example embodiments of the disclosure.

FIG. 11 illustrates a third example method for configuring CORESETPoolIndex according to an example embodiment of the disclosure.

In the third example method, the number of CORESETPoolIndex configurations may be fixed, and the disclosure describes a case in which, for example, the number of CORESETPoolIndex configurations is configured as two. However, this example embodiment of the disclosure is not limited thereto, and the number of configurations of CORESETPoolIndex may be changed. The base station may configure CORESETPoolIndex to be 0 or 1 for each PCI. Here, there may be two or more CORESETs included in CORESETPoolIndex 0 or 1. According to the third example method, the base station may be configured to cause at least one CORESET to have the same index for each PCI, the CORESETs being pooled in order to configure the inter-cell CORESETPoolIndex. In addition, according to the third example method, CORESETs having different PCIs may be configured to be included in one CORESETPoolIndex for inter-cell coordinated transmission.

For example, the base station may configure CORESET 1 for TRP 1 and CORESET 2 for TRP 2 as inter-cell CORESETPoolIndex 0 1110 for a specific UE. In addition, the base station may configure CORESET 4 for TRP 1 and CORESET 3 for TRP 2 as inter-cell CORESETPoolIndex 1 1120. The UE may determine that CORESET indexes that are not configured as CORESETPoolIndex (In FIG. 11, CORESET 2 for TRP 1, CORESET 3 for TRP 2, CORESET 1 for TRP 2, and CORESET 4 for TRP2) do not support inter-cell based M-TRP transmission. As such, the base station may configure or determine such that the total number of CORESETPoolIndex is fixed and the UE monitors all pools having the same index.

The CORESET configuration according to this example embodiment may be configured as shown in Table 14 below. Here, when two CORESETPoolIndex values are configured, the CORESETPoolIndex-r17 field may be configured to be ENUMERATED {n0, n1}, and when three CORESETPoolIndex values are configured, the CORESETPoolIndex-r17 field may be configured to be ENUMERATED {n0, n1, n3}.

Alternatively, CORESETPoolIndex may be configured by distinguishing between intra-cell and inter-cell. For example, the CORESETPoolIndex-r17 field may be configured to be ENUMERATED {n0, n1, n3}, n0 and n1 may be configured to be used for intra-cell, and n2 may be configured to be used for inter-cell.

However, this is only an example embodiment of the disclosure and the number of CORESETPoolIndex values may be changed, and accordingly, the CORESETPoolIndex-r17 field may also be configured as information such as n4, n5, and the like. In addition, when CORESETPoolIndex is configured by distinguishing between intra-cell and inter-cell, information on intra-cell and information on inter-cell may be determined according to a configuration of a base station or a predetermined rule.

TABLE 14

```
ControlResourceSet ::=          SEQUENCE {
    controlResourceSetId            ControlResourceSetId,
OPTIONAL,   -- Need S
. . .
  [[
    coresetPoolIndex-r17              ENUMERATED {n0, n1, n2}
OPTIONAL,   -- Need R
    controlResourceSetId-r17          ControlResourceSetId-r16
OPTIONAL    -- Need S
      ]]
}
```

Alternatively, according to a fourth example method of the disclosure, CORESETPoolIndex may be configured for intra-cell use, and CORESETPoolIndex CORESETPoolIndexFor-IntercellId (new parameter)) for inter-cell may be newly defined.

For example, CORESETPoolIndexForIntercellId may be configured to include CORESETPoolIndex including CORESET Id of each cell. CORESETPoolIndexForIntercellId 0 may be configured to include CORESETPoolIndex 0 or to include CORESETPoolIndex 0 and CORESETPoolIndex 1. As another example, CORESETPoolIndexForIntercellId may be configured to directly include CORESET Id of each cell.

The CORESETPoolIndexForIntercellId configuration may be configured as shown in Table 15 below.

Figure 13:
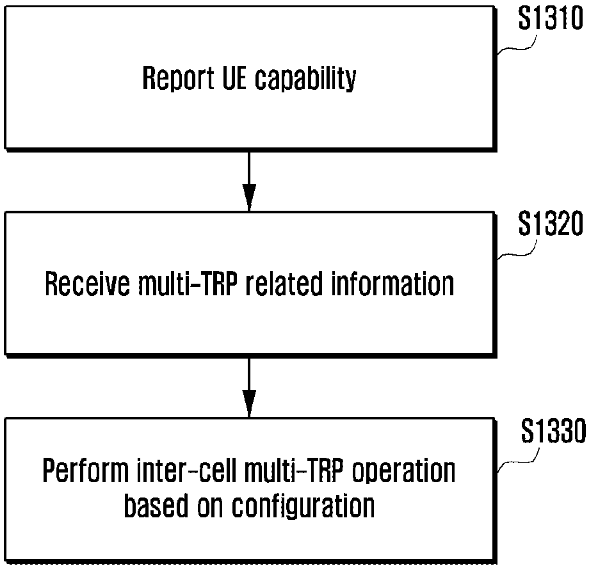
FIG. 13 illustrates an operation of a terminal according to example embodiments of the disclosure.

FIG. 13 illustrates an operation of a UE according to an example embodiment of the disclosure.

Referring to FIG. 13, the LTE may report a UE capability in operation S1310. As described above, the UE may receive a request for UE capability report from a base station and report the UE capability accordingly. The UE capability may include information on UE capability for each RAT type. In addition, the UE capability information may include information on whether the UE supports a multi-TRP operation. In addition, the UE capability may include information on whether the UE supports multi-TRP operation for inter-cell. However, not all of the above information needs to be included in the UE capability information, some information may be omitted, or other information may be added.

Meanwhile, the operation S1310 may be omitted. That is, when the base station has previously received or stored the UE capability, the UE capability report may not be requested, and the UE may not report the UE capability.

Thereafter, the UE may receive multi-TRP related configuration information in operation S1320. The Multi-TRP related configuration information may include cell related information (or coordinated cell related information), BWP related information, CORESETPoolIndex related information, and the like for an inter-cell-based M-TRP operation. Specific details are the same as described above. Accordingly, the above-described example cell configuration method, example BWP related method, example CORESETPoolIndex configuration method, etc. may be applied to this example embodiment.

TABLE 15

```
ControlResourceSet ::=                  SEQUENCE {
    controlResourceSetId                    ControlResourceSetId,
OPTIONAL,   -- Need S
. . .
  [[
//  coresetPoolIndex-r17                      INTEGER (0..1)            // the number of
                                                                        CORESETPoolIndex
OPTIONAL,   -- Need R                                                   is fixed as 2
    coresetPoolIndexForIntercellId-r17      INTEGER (0..2*maxIntercell) //N cells
    controlResourceSetID-r17                  ControlResourceSetId-r17
OPTIONAL    -- Need S
    ]]
}
```

Figure 12:
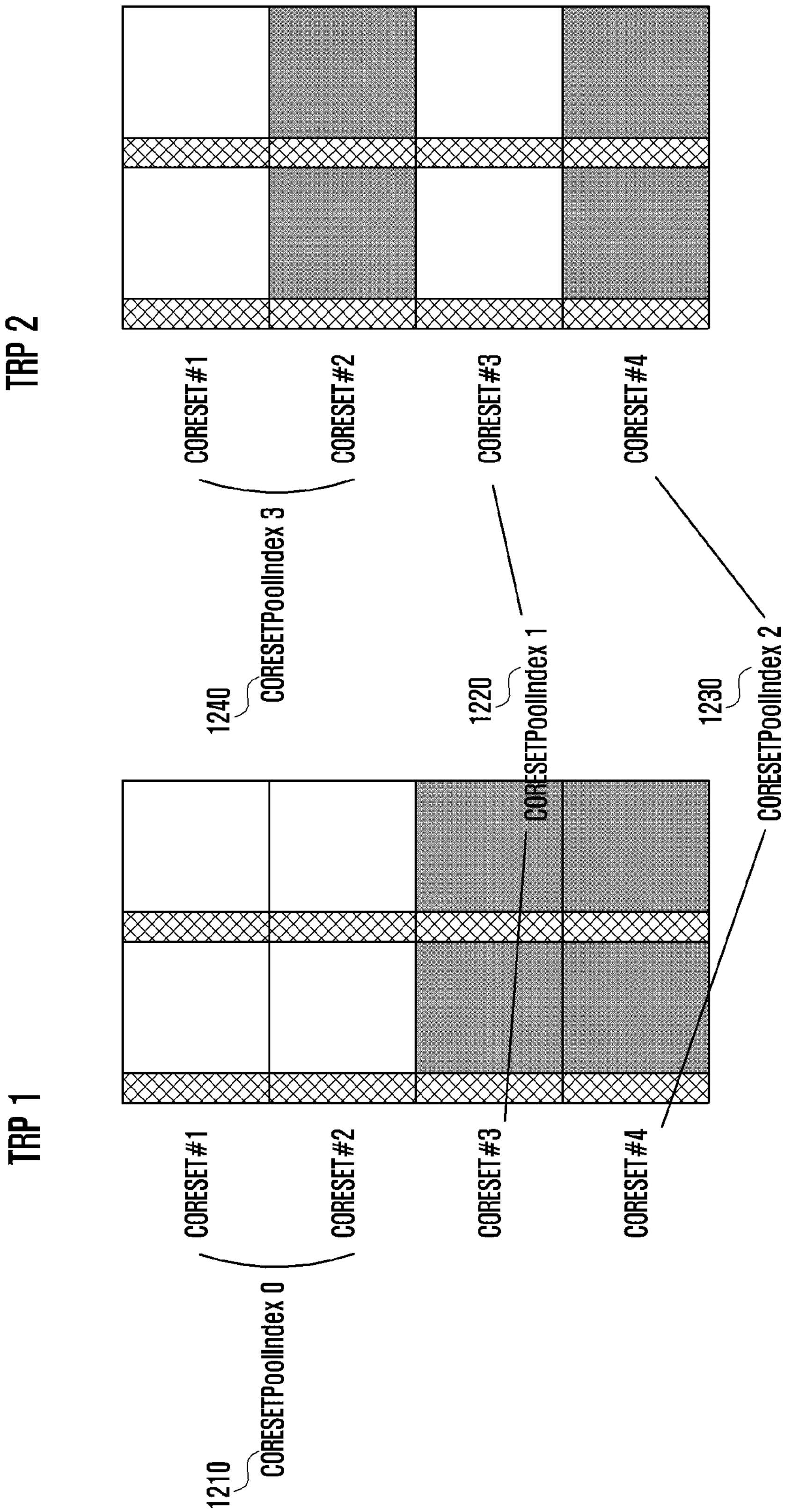
FIG. 12 illustrates a method for configuring CORESETPoolIndex according to example embodiments of the disclosure.

FIG. 12 illustrates a fifth example method for configuring CORESETPoolIndex according to an example embodiment of the disclosure.

The fifth example method proposes expending the number of CORESETPoolIndex configurations. In this case, the base station may increase the number of pools to as many as the number of PCIs considering the entire inter-cell. For example, when only five CORESETs are assumed to be included in one BWP and N PCIs are configured, 2*N CORESETPoolIndex values may be configured.

For example, when describing with reference to FIG. 12, in two TFRPs having two PCIs, CORESETPoolIndex 0 1210 may include CORESET 1 for TRP 1 and CORESET 2 for TRP 1, CORESETPoolIndex 1 1220 may include CORESET 3 for TRP 1 and CORESET 3 for TRP 2, CORESETPoolIndex 2 1230 may include CORESET 4 for TRP 1 and CORESET 4 for TRP 2, and CORESETPoolIndex 3 1240 may be configured to include CORESET 1 for TRP 2 and CORESET 2 for TRP 2. Alternatively, even if the CORESET index of TRP 2 is continuously configured such as 5, 6, 7, and 8, the CORESETPoolIndex mapping may be configured similarly.

Accordingly, the UE may perform PDCCH monitoring for multi-TRP operation according to the configured CORESETPoolIndex.

Accordingly, the UE may perform an inter-cell multi-TRP operation in operation S1330. Specifically, the UE may be configured to identify that the inter-cell multi-TRP operation has been configured through the cell-related information. In addition, the UE may identify information on CORESET to be monitored for multiple TRPs using the CORESETPoolIndex information.

Accordingly, the UE may be configured to monitor a PDCCH in the CORESET for the multiple TRPs and acquire DCI. In addition, the UE may be configured to receive or transmit data through a PDSCH scheduled by the DCI.

Figure 14:
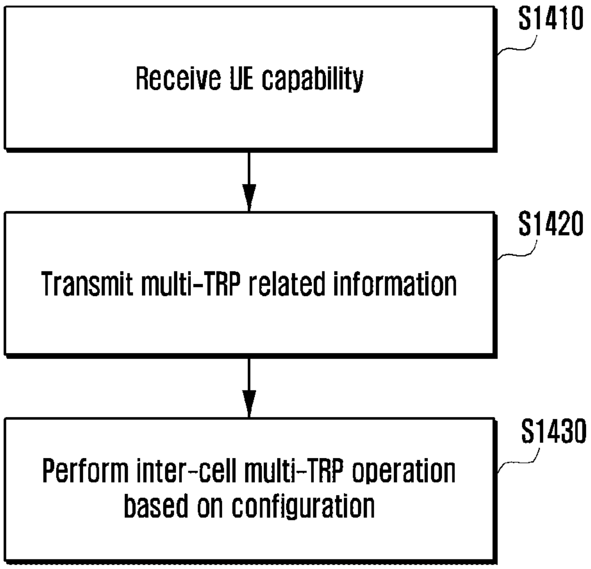
FIG. 14 illustrates an operation of a base station according to example embodiments of the disclosure.

FIG. 14 illustrates an operation of a base station according to an example embodiment of the disclosure.

Referring to FIG. 14, the base station may receive a UE capability in operation S1410. Specific details are the same as described above, and thus will be omitted below. In addition, as described above, when the base station has previously received or stored the UE capability, the UE capability report may not be requested, and operation S1410 may be omitted.

Thereafter, the base station may transmit multi-TRP related configuration information in operation S1420. The multi-TRP-related configuration information may include cell-related information (or coordinated cell-related information), BWP-related information, CORESETPoolIndex-related information, and the like for an inter-cell-based M-TRP operation. Specific details are the same as described above. Accordingly, the above-described example cell configuration method, example BWP related method, example CORESETPoolIndex configuration method, etc. may be applied to this example embodiment.

Accordingly, the base station may perform an inter-cell multi-TRP operation in operation S1430. Specifically, the base station may provide, to the UE, an indication that the inter-cell multi-TRP operation is configured through the cell-related information. In addition, the base station may notify the UE of information on CORESET to be monitored for multiple TRPs by using the CORESETPoolIndex information.

Accordingly, the base station may transmit DCI in CORESET for the multiple TRPs. In addition, the UE may receive or transmit data through a PDSCH scheduled by the DCI.

Figure 15:
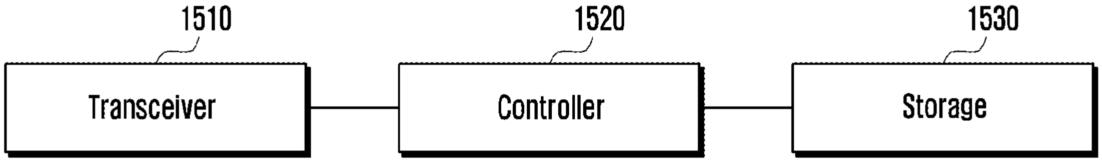
FIG. 15 illustrates a structure of a terminal according to example embodiments of the disclosure.

FIG. 15 illustrates the structure of a UE according to an example embodiment of the disclosure.

Referring to FIG. 15, the UE may include a transceiver 1510, a controller 1520, and a storage 1530. In the disclosure, the controller may be defined as a circuit, an application-specific integrated circuit, or at least one processor.

The transceiver 1510 may transmit/receive a signal to/from another network entity. The transceiver 1510 may report, for example, a UE capability to the base station, and may receive multi-TRP configuration information from the base station.

The controller 1520 may control the overall operation of the UE according to the embodiment proposed in the disclosure. For example, the controller 1520 may control a signal flow between blocks to perform an operation according to the above-described flowchart. For example, the controller 1520 may receive multi-TRP configuration information according to an example embodiment of the disclosure, and may identify that an inter-cell multi-TRP operation is configured based thereon. In addition, the controller 1520 may identify the CORESETPoolIndex according to the multi-TRP configuring information. Accordingly, the controller 1520 may monitor CORESETs of multiple TRPs based on the CORESETPoolIndex. In addition, the controller 1520 may transmit/receive data based on the received DCI. Since specific details are the same as described above, this will be omitted below.

The storage 1530 may store at least one of information transmitted or received through the transceiver 1510 and information generated through the controller 1520.

Figure 16:
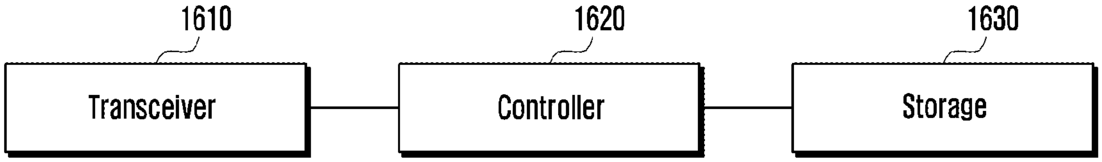
FIG. 16 illustrates a structure of a base station according to example embodiments of the disclosure.

FIG. 16 illustrates the structure of a base station according to an example embodiment of the disclosure.

Referring to FIG. 16, the base station may include a transceiver 1610, a controller 1620, and a storage 1630. In the disclosure, the controller may be defined as a circuit, an application-specific integrated circuit, or at least one processor.

The transceiver 1610 may transmit/receive signals to/from another network entity. The transceiver 1610 may receive, for example, UE capability from a UE, and may transmit multi-TRP configuration information to the UE.

The controller 1620 may control the overall operation of the base station according to the example embodiment proposed in the disclosure. For example, the controller 1620 may control a signal flow between blocks to perform an operation according to the above-described flowchart. For example, the controller 1620 may transmit multi-TRP configuration information according to an embodiment of the disclosure, and may notify the UE that an inter-cell multi-TRP operation is configured through the information. In addition, the controller 1620 may transmit CORESETPoolIndex to the UE according to the multi-TRP configuration information. Accordingly, the controller 1620 may transmit DCI through CORESETs of multiple TRPs based on the CORESETPoolIndex. In addition, the controller 1620 may transmit or receive data through a PDSCH scheduled based on DCI. Since specific details are the same as described above, this will be omitted below.

The storage 1630 may store at least one of information transmitted or received through the transceiver 1610 and information generated through the controller 1620.

Accordingly, a method according to various example embodiments of the disclosure includes: receiving configuration information related to a multi-transmission reception point (multi-TRP); identifying whether inter-cell multi-TRP transmission is configured based on the configuration information; in case that the inter-cell multi-TRP transmission is configured, identifying a control resource set (CORESET) for multi-TRP based on the configuration information; receiving downlink control information (DCI) for the multi-TRP through the CORESET; and receiving data from the multi-TRP based on the DCI.

In addition, according to various example embodiments of the disclosure, a method by a base station in a wireless communication system includes: transmitting configuration information related to a multi-transmission reception point (multi-TRP); in case that inter-cell multi-TRP transmission is configured, transmitting downlink control information (DCI) for the multi-TRP through a control resource set (CORESET) for multi-TRP based on the configuration information; and transmitting data through the multi-TRP based on the DCI.

In addition, according to various example embodiments of the disclosure, a terminal in a wireless communication system includes: a transceiver; and a controller configured to: receive configuration information related to a multi-transmission reception point (multi-TRP) through the transceiver; identify whether inter-cell multi-TRP transmission is configured based on the configuration information; in case that the inter-cell multi-TRP transmission is configured, identify a control resource set (CORESET) for multi-TRP based on the configuration information; receive downlink control information (DCI) for the multi-TRP through the CORESET through the transceiver; and receive data from the multi-TRP based on the DCI through the transceiver.

In addition, according to various example embodiments of the disclosure, a base station in a wireless communication system includes:

a transceiver; and a controller configured to: transmit configuration information related to a multi-transmission reception point (multi-TRP) through the transceiver; in case that inter-cell multi-TRP transmission is configured, transmit downlink control information (DCI) for the multi-TRP through a control resource set (CORESET) for multi-TRP based on the configuration information through the transceiver; and transmit data through the multi-TRP based on the DCI through the transceiver.

In addition, according to various example embodiments of the disclosure, a method by a terminal in a wireless communication system includes: receiving configuration information related to coordinated transmission from a serving cell of a base station; identifying whether coordinated transmission between the serving cell and a non-serving cell is configured, based on the configuration information; in case that the coordinated transmission is configured, identifying a control resource set (CORESET) for coordinated transmission based on the configuration information; receiving downlink control information (DCI) for the coordinated transmission through the CORESET; and receiving data from the serving cell and the non-serving cell based on the DCI.

In the drawings in which example methods of the disclosure are described, the order of the description does not always correspond to the order in which steps of each method are performed, and the order relationship between the steps may be changed or the steps may be performed in parallel.

Alternatively, in the drawings in which example methods of the disclosure are described, some elements may be omitted and only some elements may be included therein without departing from the essential spirit and scope of the disclosure.

Furthermore, in example methods of the disclosure, some or all of the contents of each embodiment may be implemented in combination without departing from the essential spirit and scope of the disclosure. While the disclosure has been illustrated and described with reference to various example embodiments, it will be understood that the various example embodiments are intended to be illustrative, not limiting. It will be further understood by one skilled in the art that various changes in form and detail may be made without departing from the true spirit and full scope of the disclosure, including the appended claims and their equivalents.

What is claimed is:

1. A method by a terminal in a wireless communication system supporting multi-transmission reception point (multi-TRP) including a first TRP and a second TRP, the method comprising:

obtaining configuration information related to an inter-cell multi-TRP transmission using higher layer signaling;

obtaining transmission configuration indication (TCI) state information including information indicating a second physical cell ID (PCI) corresponding to the second TRP, the second PCI being different from a first PCI corresponding to the first TRP;

receiving first downlink control information (DCI) on a first physical downlink control channel (PDCCH) of a first control resource set (CORESET) from the first TRP and second DCI on a second PDCCH of a second CORESET from the second TRP; and receiving first data from the first TRP based on the first DCI and second data from the second TRP based on the second DCI, wherein the first PCI of a serving cell associated with the first TRP is related to a first CORESET pool index, the second PCI associated with the second TRP is related to a second CORESET pool index, and the first CORESET pool index and the second CORESET pool index are identified in the configuration information.

2. The method of claim 1, further comprising:

identifying the first CORESET pool index and the second CORESET pool index included in the configuration information, and wherein the first CORESET corresponds to the first CORESET pool index, and the second CORESET corresponds to the second CORESET pool index.

3. The method of claim 1, further comprising:

receiving a terminal capability information request; and transmitting terminal capability information including information associated with the inter-cell multi-TRP transmission being supported.

4. A method by a first transmission reception apparatus for a serving cell in a wireless communication system supporting multi-transmission reception point (multi-TRP), the method comprising:

transmitting configuration information related to an inter-cell multi-TRP transmission to a terminal using higher layer signaling;

transmitting transmission configuration indication (TCI) state information including information indicating a second physical cell ID (PCI) corresponding to a second transmission reception apparatus for another cell, the second PCI being different from a first PCI corresponding to the first transmission reception apparatus;

transmitting first downlink control information (DCI) on a first physical downlink control channel (PDCCH) of a first control resource set (CORESET) based on the configuration information; and transmitting first data based on the first DCI, wherein second DCI is received, by the terminal, on a second PDCCH of a second CORESET from the second transmission reception apparatus, wherein second data is transmitted to the terminal from the second transmission reception apparatus based on the second DCI, and wherein the first PCI of a serving cell associated with the first transmission reception apparatus is related to a first CORESET pool index, the second PCI associated with the second transmission reception apparatus is related to a second CORESET pool index, and the first CORESET pool index and the second CORESET pool index are identified in the configuration information.

5. The method of claim 4, wherein, in case that the first CORESET pool index and the second CORESET pool index are included in the configuration information, the first CORESET corresponds to the first CORESET pool index, and the second CORESET corresponds to the second CORESET pool index.

6. The method of claim 4, further comprising:

transmitting a terminal capability information request; and receiving terminal capability information including information associated with the inter-cell multi-TRP transmission being supported.

7. A terminal in a wireless communication system supporting multi-transmission reception point (multi-TRP) including a first TRP and a second TRP, the terminal comprising:

a transceiver; and at least one processor comprising processing circuitry; and a memory storing instructions which, when executed individually and/or collectively by the at least one processor, controls the terminal to:

obtain configuration information related to an inter-cell multi-TRP transmission using higher layer signaling, obtain transmission configuration indication (TCI) state information including information indicating a second physical cell ID (PCI) corresponding to the second TRP, the second PCI being different from a first PCI corresponding to the first TRP, receive, via the transceiver, first downlink control information (DCI) on a first physical downlink control channel (PDCCH) of a first control resource set (CORESET) from the first TRP and second DCI on a second PDCCH of a second CORESET from the second TRP, and receive, via the transceiver, first data from the first TRP based on the first DCI and second data from the second TRP based on the second DCI, wherein the first PCI of a serving cell associated with the first TRP is related to a first CORESET pool index, the second PCI associated with the second TRP is related to a second CORESET pool index, and the first CORESET pool index and the second CORESET pool index are identified in the configuration information.

8. The terminal of claim 7, wherein the memory stores instructions which, when executed individually and/or collectively by the at least one processor, controls the terminal to:

receive, via the transceiver, a terminal capability information request, and transmit, via the transceiver, terminal capability information including information associated with the inter-cell multi-TRP transmission being supported.

9. A first transmission reception apparatus for a serving cell in a wireless communication system supporting multi-transmission reception point (multi-TRP), the first transmission reception apparatus comprising:

a transceiver; and at least one processor comprising processing circuitry; and a memory storing instructions which, when executed individually and/or collectively by the at least one processor, controls the first transmission reception apparatus to:

transmit, via the transceiver, configuration information related to an inter-cell multi-TRP transmission to a terminal using higher layer signaling, transmit transmission configuration indication (TCI) state information including information indicating a second physical cell ID (PCI) corresponding to a second transmission reception apparatus for another cell, the second PCI being different from a first PCI corresponding to the first transmission reception apparatus, transmit, via the transceiver, first downlink control information (DCI) on a first physical downlink control channel (PDCCH) of a first control resource set (CORESET) based on the configuration information, and transmit, via the transceiver, first data based on the first DCI, wherein the first PCI of a serving cell associated with the first transmission reception apparatus is related to a first CORESET pool index, the second PCI associated with the second transmission reception apparatus is related to a second CORESET pool index, and the first CORESET pool index and the second CORESET pool index are identified in the configuration information.

10. A system including the first transmission reception apparatus of claim 9, further comprising a second transmission reception apparatus, the second transmission reception apparatus comprising:

a transceiver; and at least one processor comprising processing circuitry; and a memory storing instructions which, when executed individually and/or collectively by the at least one processor, controls the second transmission reception apparatus to:

transmit, via the transceiver, second downlink control information (DCI) on a second physical downlink control channel (PDCCH) of a second control resource set (CORESET) based on the configuration information, and transmit, via the transceiver, second data based on the second DCI.

11. The first transmission reception apparatus of claim 9, wherein memory stores instructions which, when executed individually and/or collectively by the at least one processor, controls the first transmission reception apparatus to:

transmit, via the transceiver a terminal capability information request, and receive, via the transceiver, terminal capability information including information associated with the inter-cell multi-TRP transmission being supported.

* * * * *